US012673459B2

(12) United States Patent
Nawrocki et al.

(10) Patent No.: US 12,673,459 B2
(45) Date of Patent: Jul. 7, 2026

(54) CAPACITIVE SENSORS AND METHODS AND APPARATUSES FOR PRODUCING CAPACITIVE SENSORS

(71) Applicant: Purdue Research Foundation, West Lafayette, IN (US)

(72) Inventors: Robert A. Nawrocki, Lafayette, IN (US); Jinsheng Fan, Minneapolis, MN (US); Brittany Newell, Delphi, IN (US); Jose Manuel Garcia-Bravo, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 234 days.

(21) Appl. No.: 18/336,191

(22) Filed: Jun. 16, 2023

(65) Prior Publication Data

US 2023/0405920 A1 Dec. 21, 2023

Related U.S. Application Data

(60) Provisional application No. 63/352,865, filed on Jun. 16, 2022.

(51) Int. Cl.
B29C 64/118 (2017.01)
B01D 71/34 (2006.01)
(Continued)

(52) U.S. Cl.
CPC ............ B29C 64/118 (2017.08); B01D 71/34 (2013.01); B29C 64/209 (2017.08); (Continued)

(58) Field of Classification Search
CPC ... B29C 64/118; B29C 64/209; B29C 64/307; B01D 71/34; B33Y 10/00; B33Y 80/00; (Continued)

(56) References Cited

U.S. PATENT DOCUMENTS

| | | | |
|---|---|---|---|
| 4,862,893 A | * 9/1989 | Martinelli | ............ A61B 8/4254 |
| | | | 600/459 |
| 6,321,428 B1 | * 11/2001 | Toda | ..................... B06B 1/0688 |
| | | | 29/25.35 |

(Continued)

FOREIGN PATENT DOCUMENTS

| | | | | |
|---|---|---|---|---|
| JP | 2004362976 A | * 12/2004 | | |
| WO | WO-8805606 A1 | * 7/1988 | .......... | H10N 30/302 |
| WO | WO-2021216033 A1 | * 10/2021 | ............... | H01G 4/30 |

OTHER PUBLICATIONS

JP-2004362976-A, English Translation (Year: 2004).*

(Continued)

*Primary Examiner* — Ryan D Walsh
(74) *Attorney, Agent, or Firm* — Hartman Global IP Law; Gary M. Hartman; Domenica N. S. Hartman

(57) ABSTRACT

Capacitive sensors and methods and apparatuses for producing capacitive sensors. Such a method includes printing a dielectric layer to include a poly(vinylidene fluoride) (PVdF) film so that the dielectric layer has oppositely-disposed first and second surfaces. First and second electrodes are provided on the first and second surfaces, respectively, of the dielectric layer. A corona poling apparatus for producing a capacitive sensor includes an anode having at least one electrically conductive ionizer needle, a cathode opposite and facing the anode with a distance therebetween, a sample location defined between the ionizer needle and the cathode wherein the sample location is configured to receive an object to be polarized, and a shield surrounding at least one of the anode, the ionizer needle, and the cathode. The shield focuses ions created during a corona discharge between the anode and the cathode toward the sample location.

4 Claims, 16 Drawing Sheets

(51) Int. Cl.

| | |
|---|---|
| *B29C 64/209* | (2017.01) |
| *B29C 64/307* | (2017.01) |
| *B33Y 10/00* | (2015.01) |
| *B33Y 80/00* | (2015.01) |

(52) U.S. Cl.
CPC ............ *B29C 64/307* (2017.08); *B33Y 10/00* (2014.12); *B33Y 80/00* (2014.12)

(58) Field of Classification Search
CPC .. H10N 30/302; H10N 30/045; H10N 30/074; H10N 30/098
See application file for complete search history.

(56) References Cited

U.S. PATENT DOCUMENTS

| | | | | |
|---|---|---|---|---|
| 7,997,144 | B1 * | 8/2011 | Pekarek ................... | G01L 1/16 73/777 |
| 2011/0003279 | A1 * | 1/2011 | Patel ...................... | G01D 7/005 436/1 |
| 2015/0044386 | A1 * | 2/2015 | Vilkomerson ......... | H10N 30/01 427/58 |
| 2016/0016369 | A1 * | 1/2016 | Tarbutton .............. | B29C 64/106 264/435 |
| 2018/0036939 | A1 * | 2/2018 | Sundaresan ............ | B33Y 30/00 |
| 2019/0054659 | A1 * | 2/2019 | Tseng ..................... | B33Y 70/10 |
| 2020/0189188 | A1 * | 6/2020 | Hsu ....................... | B29C 64/118 |
| 2022/0001597 | A1 * | 1/2022 | Sodano ................. | B29C 64/106 |
| 2022/0305719 | A1 * | 9/2022 | Vella ........................ | C09D 4/06 |
| 2023/0405931 | A1 * | 12/2023 | Nawrocki .............. | B33Y 40/20 |
| 2024/0326292 | A1 * | 10/2024 | Vella .......................... | C08J 3/12 |

OTHER PUBLICATIONS

WO-2021216033-A1, English Translation (Year: 2021).*
WO-8805606-A1, English Translation (Year: 1988).*
3D printing of polyvinylidene fluoride/photopolymer resin blends for piezoelectric pressure sensing application using the stereolithography technique; Kim et al.; MRS Communications Research Letter; doi: 10.1557/mrc.2019.109; 2019 (Year: 2019).*
"Effect of Additive Manufacturing on β-Phase Poly(Vinylidene Fluoride)-Based Capacitive Temperature Sensors"; Jinsheng Fan, Brittany Newell, Jose Garcia, Richard M. Voyles, and Robert A. Nawrocki; www.aem-journal.com; DOI: 10.1002/adem. 202200485; 2022 (Year: 2022).*
"Fused filament fabrication of PVDF films for piezoelectric sensing and energy harvesting applications"; Tao et al.; Royal Society of Chemistry Materials Advances; DOI: 10.1039/d2ma00072e; Published May 2, 2022 (Year: 2022).*
"Single-Process Fused Filament Fabrication 3D-Printed High-Sensitivity Dynamic Piezoelectric Sensor"; Kosir et al.; ScienceDirect; https://doi.org/10.1016/j.addma.2021.102482; https://www.sciencedirect.com/science/article/pii/S2214860421006291?via%3Dihub; Jan. 2022 (Year: 2022).*
Supplementary Info for "Fused filament fabrication of PVDF films for piezoelectric sensing and energy harvesting applications"; Tao et al.; Royal Society of Chemistry Materials Advances; DOI: 10.1039/d2ma00072e; Published May 2, 2022 (Year: 2022).*
Jinsheng Fan, et al; The Effects of Additive Manufacturing and Electric Poling Techniques on PVDF Thin Films: Towards 3D Printing Functional Materials; Sep. 14-16, 2020; 9 Pages; Proceedings of the ASME 2020 Conference on Smart Materials, Adaptive Structures and Intelligent Systems; Irvine, CA, USA.
Jinsheng Fan, et al; Contact-Poling Enhanced, Fully 3D Printed PVDF Pressure Sensors: Towards 3D Printed Functional Materials; Sep. 14-15, 2021; 11 pages; Proceedings of the ASME 2021 Conference on Smart Materials, Adaptive Structures and Intelligent Systems; Irvine, CA, USA.

* cited by examiner

CAPACITIVE SENSORS AND METHODS AND APPARATUSES FOR PRODUCING CAPACITIVE SENSORS

CROSS-REFERENCE TO RELATED APPLICATIONS

This application claims the benefit of U.S. Provisional Application No. 63/352,865 filed Jun. 16, 2022, the contents of which are incorporated herein by reference.

BACKGROUND OF THE INVENTION

The invention generally relates to capacitive sensors and to methods and apparatuses for producing capacitive sensors.

Interest and research into soft-bodied robots, inspired by the bio-mechanical capabilities of animals such as octopi, have significantly increased. Lightweight designs, sensory information gathering capabilities, and semi-compliant ("soft") mechanical features enable soft robots to achieve high performance and improved safety when compared to more rigid counterparts when interacting with humans or working in environments and tasks which require more delicate contact with the environment, humans, or objects. Soft robots can safely perform physical human-robot interactions through collaborative manipulation in order to complete complex tasks, which is beyond the capabilities of typical hard, rigid robot frameworks.

The flexibility and compliance features that make soft robots advantageous also cause challenges in terms of precise control of their motions and architecture. The predominant hurdle in ensuring such precise control is not with data gathering, data processing algorithms, or programming. Rather, the challenge is associated with inadequately precise or compact sensing capabilities with which to acquire the data necessary to provide such precise motions in a compliant or semi-compliant manner. In particular, a bottleneck exists in manufacturing sensors, particularly pressure sensors, that are sufficiently small to be applicable in the smallest soft robots, but are sufficiently data-rich such that they can provide the information necessary to drive such precise motions. Additionally, such sensors must be constructed such that they are structurally in accordance with the compliant or semi-compliant framework of the soft robot.

Since the earliest research of flexible pressure sensors, many innovative ideas have been studied and developed to design and fabricate sensing components, including pressure sensors, for soft robots. Conventional manufacturing, specifically subtractive manufacturing (milling, lathing, etc.) are no longer sufficient for manufacturing flexible or deformable soft components used to construct such soft robots. Instead, additive manufacturing can locally deposit a precise amount of material to form three-dimensional objects directly. However, the use of three-dimensional (3D) printing technology opens a new pathway for the creation of soft robotic systems integrating soft deformable parts with electrical circuitry, benefiting from soft compliant materials and desired functionality, and taking inspiration from nature.

Additive manufacturing is the formalized term including what is popularly referred to as 3D printing. 3D printing technology can significantly simplify the process of producing 3D objects directly from a 3D computer-aided design (3D CAD) model. At present, fused filament fabrication (FFF) or fused deposition modeling (FDM) is a well-known type of 3D printing process. Ever since the appearance of FDM, advancements of FDM have focused on exploring and demonstrating 3D-printed objects with newly complex geometry structures. In recent years, researchers have mainly applied extrusion-based 3D printing processes (i.e., FDM) to print electro-conductive materials in mechanical structures to produce 3D objects with complex shapes and electrical functionality (e.g., conductive traces, resistive strain gauges, capacitive sensors) to realize desired functionalities (e.g., strain sensing, temperature sensing). Previous work has presented 3D-printed circuits with both planar and vertical interconnections printed using copper-based filament. These printed circuits integrated FDM-printed conductive traces (with a resolution of 0.67 mm) with small-outlined integrated circuits (e.g., op-amp), which opened a new opportunity to provide higher-density 3D-printed circuits.

Another development in 3D printing is direct writing (DW). DW technologies are processes using a 3D programmable deposition or dispensing head to write or print passive or active electronic elements accurately (e.g., capacitors, resistors, insulators, conductors, etc.). Further development of FDM and DW technology has enabled the production of a new 3D printing process in which materials or "inks" are extruded through a syringe and deposited layer-by-layer to create 3D object without the need for thermal processing (i.e., heating or cooling) during the printing process. This ink-based DW or direct ink writing (DIW) is the least expensive and most straightforward method to perform DW. Once the ink is deposited on a substrate, it becomes solid through solvent evaporation, gelation, or other physical processes or chemical reactions to print desired structures. Furthermore, DIW has become the most versatile method to realize DW due to the use of a significant number of ink types, including nanoparticle-filled inks, colloidal inks, polyelectrolyte inks, fugitive organic inks, and sol-gel inks.

The development of DW technology enables the manufacturing of complex electronic circuity and macroscale devices mounted onto or embedded within 3D objects. Previous work has demonstrated a hybrid 3D printing process by combining DIW of conductive and dielectric elastomeric materials with automated pick-and-place of surface mount electronic elements to yield soft electronic devices for application in soft robots. Similarly, advancements have been made in providing DIW-printed capacitive sensors with low-cost, facile, and scalable manufacturing features for soft systems. The sensor produced was highly stretchable with consistent strain performance of up to 250% without noticeable changes in performance after 1000 stretching-and-releasing cycles. Furthermore, FDM and DIW processes can combine to realize a hybrid 3D printing technology to print components or devices consisting of multiple materials. Previous work has combined multiple materials to print pressure sensors embedded into pneumatic actuators.

For applications in soft robots, capacitive-type sensors are generally preferred due to their simple construction, low power consumption, fast dynamic response, wide application range, low hysteresis (i.e., more rapid response with respect to resistive sensors), and endurance. A capacitor is a device capable of storing electrical energy in the form of an electric field. Micro-electro-mechanical system (MEMS) technology was initially the most widely used method to prepare capacitive sensors. However, MEMS technology requires multiple steps, making the fabrication process more complex and expensive. Additionally, silicon-based devices commonly produced from such a process are hard and brittle and cannot deform to accommodate externally applied forces.

Various methods have been developed for fabricating flexible capacitive sensors, including 3D printing technology. A printed soft capacitive pressure sensor has been reported to exhibit a sensitivity of 3.48 Pa$^{-1}$ for pressures lower than 10 kPa, and 1.34 Pa$^{-1}$ for pressures higher than 10 kPa. The pressure sensor was 3D-printed with silver paint and soft rubber integrated on a soft robotic hand. Previous work has reported a 3D-printed metamaterial capacitive sensing array for a universal jamming gripper and human elbow wearables. This work took the advantage of 3D printing to print soft capacitive sensor arrays with three different metamaterial designs to prove the possibility of customizing Poisson's ratio through 3D printing technology. This was done to improve compliance and conformability in order to accommodate diverse surface morphological deformations in soft robots. Another example of a 3D-printed flexible poly(methyl methacrylate) (PMMA) based capacitive pressure sensor was measured to show a non-linear sensitivity with 3.8 kPa$^{-1}$ for a pressure range of 45 Pa to 500 Pa, 0.8 kPa$^{-1}$ in a range of 500 Pa to 2.5 kPa, and 0.35 kPa$^{-1}$ in a range of 2.5 kPa to 4.5 kPa. The 3D-printed sensors exhibited high sensitivity to detect small pressure values of about 15 Pa and their free form flexible sensors arrays could be installed on any structures with complex geometries to detect the spatial distribution of applied pressure.

Capacitive acoustic transducers and piezoelectric transducers are another potential application of capacitive pressure sensors. For example, 2D inkjet printing of conductive ink has been performed on a pre-stressed organic thin film to realize surface metallization of a membrane as the diaphragm of the acoustic sensor. At present, various polymeric materials based dielectric materials have been universally studied and used as alternatives to silicon-based materials, such as polyurethane (PU), poly(dimethyl siloxane) (PDMS), and poly(vinylidene fluoride) (PVdF). Notable features of these polymeric materials are their high degree of stretchability and flexibility. In particular, PVdF has high chemical resistance, electrical insulation, and is biocompatible, such that PVdF is well suited for applications as sensors. In addition, PVdF is a thermoplastic material which has a glass transition temperature of around −37° C., and a melting point of 179° C. The typical thermal transition temperature range makes PVdF 3D printable with FDM process.

The simplest design of a capacitor consists of two parallel conductive plates separated by a dielectric material. When all of the components can be printed, the device is regarded as a fully 3D-printed device. Capacitive sensors with electrodes based on conductive ink have been studied for many years and may provide a new route for the fabrication of electronic circuits and devices. The growing interest in DIW processes comes from the new possibilities offered by conductive inks. Conductive inks have been applied in the fabrication of a variety of capacitive sensors for many different applications including e-skin touch sensors and humidity sensors.

In light of the above, it would be desirable to provide advantages associated with capacitive sensors, specifically for their application in soft robots, by producing them with emerging 3D printing technology, while also overcoming performance and materials constraints associated with the technology.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, capacitive sensors and to methods and apparatuses for producing capacitive sensors.

According to a nonlimiting aspect, a capacitive sensor includes a 3D-printed dielectric layer having a first surface and a second surface oppositely disposed from the first surface, a first electrode on the first surface of the dielectric layer and deposited by direct ink writing, and a second electrode on the second surface of the dielectric layer and deposited by direct ink writing. The dielectric layer is polarized.

According to another nonlimiting aspect of the invention, a method of manufacturing a capacitive sensor includes printing a dielectric layer comprising a poly(vinylidene fluoride) (PVdF) film and having a first surface and a second surface oppositely disposed from the first surface, providing a first electrode on the first surface of the dielectric layer, and providing a second electrode on the second surface of the dielectric layer.

According to yet another nonlimiting aspect of the invention, a corona poling apparatus includes an anode having at least one electrically conductive ionizer needle, a cathode opposite and facing the anode with a distance therebetween, a sample location defined between the ionizer needle and the cathode, the sample location being configured to receive an object to be polarized, and a shield surrounding at least one of the anode, the ionizer needle, and the cathode. The shield focuses ions created during a corona discharge between the anode and the cathode toward the sample location.

Technical aspects of sensors, methods, and apparatuses as described above preferably include the ability to produce a fully 3D-printed flexible poly(vinylidene fluoride) (PVdF) capacitive sensor.

These and other aspects, arrangements, features, and/or technical effects will become apparent upon detailed inspection of the figures and the following detailed description.

BRIEF DESCRIPTION OF THE DRAWINGS

FIG. 5A is for a layer height of 0.2 mm and printing bed temperature at 70° C. FIG. 5B is for a layer height of 0.2 mm and printing bed temperature at room temperature (25° C.). FIG. 5C is for a layer height of 0.1 mm and printing bed temperature at room temperature (25° C.). The corresponding nozzle temperatures and printing speeds are specified.

DETAILED DESCRIPTION OF THE INVENTION

Figures 1A, 1B, 1C:
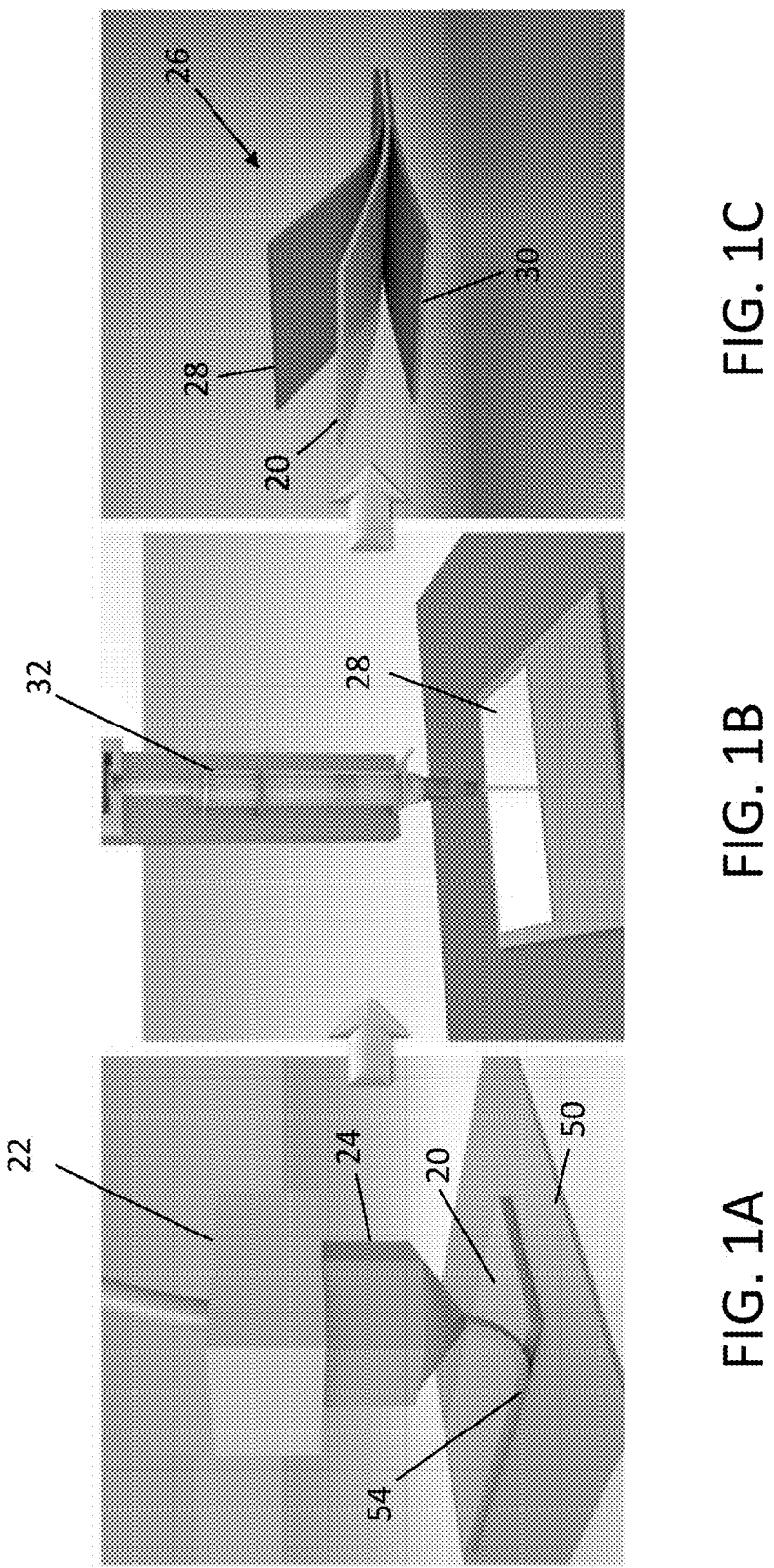
FIGS. 1A through 1C schematically represent a hybrid 3D printing process for producing a flexible PVdF-based capacitive sensor.

The intended purpose of the following detailed description of the invention and the phraseology and terminology employed therein is to describe what is shown in the drawings, which depict and/or relate to one or more nonlimiting embodiments of the invention, and to describe certain but not all aspects of the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the claims, and not the detailed description, are intended to recite what are believed to be aspects of the invention, including certain but not necessarily all of the aspects and alternatives described in the detailed description.

To facilitate the description provided below of the embodiment(s) represented in the drawings, relative terms, including but not limited to, "proximal," "distal," "anterior,"

"posterior," "vertical," "horizontal," "lateral," "front," "rear," "side," "forward," "rearward," "top," "bottom," "upper," "lower," "above," "below," "right," "left," etc., may be used in reference to the orientation of the capacitive sensor and corona poling apparatus during its use and/or as represented in the drawings. All such relative terms are useful to describe the illustrated embodiment(s) but should not be otherwise interpreted as limiting the scope of the invention.

According to a nonlimiting aspect of the present invention, a capacitive sensor is provided that is capable of being produced entirely by 3D printing methods. As represented in FIG. 1C, the capacitive sensor 26 comprises a thin dielectric layer 20 having oppositely-disposed surfaces, a DIW-printed first electrode 28 disposed on a first (top) of the two surfaces of the dielectric layer 20, and a DIW printed second electrode 30 disposed on the second (bottom) surface of the dielectric layer 20, such that the electrodes 28 and 30 are approximately parallel with each other. As will be discussed in more detail below, the dielectric layer 20 is polarized. A preferred but nonlimiting aspect of the invention is that the capacitive sensor 26 is a PVdF capacitive temperature sensor 26.

The capacitive temperature sensor 26 can be constructed using a fused deposition modeling (FDM)-printed PVdF film as the dielectric layer 20. FIG. 1A represents the dielectric layer 20 in the process of being formed by a filament of a molten PVdF material that is being printed (extruded) with an FDM 3D printer 22 through a nozzle 24 onto a printing bed 50. The nozzle 24 and/or bed 50 are manipulated to deposit "roads" 54 of the PVdF material onto the printing bed 50 in a manner that gradually builds the dielectric layer 20. Using such an apparatus, the dielectric layer 20 may be printed to have a thickness of about 180 μm to about 280 μm, and when sandwiched between the DIW-printed electrodes 28 and 30 the entire device thickness of the sensor 26 may be about 200 μm to about 380 μm, though lesser and greater thicknesses are foreseeable. The relative motion of the nozzle 24 to the bed 50 effectively induces a printed speed, which is preferably utilized to facilitate mechanical drawing of the molten PVdF filament as it is being deposited onto the bed 50, thereby increasing the β-phase content of the dielectric layer 20 and providing advantages to the sensitivity of the capacitive temperature sensor 26. In a particular embodiment detailed below, a high β-phase content of about 21.30% was achieved by performing the printing with the nozzle 24 at a temperature of 200° C. and a print speed of 70 mm s$^{-1}$.

Figure 5A:
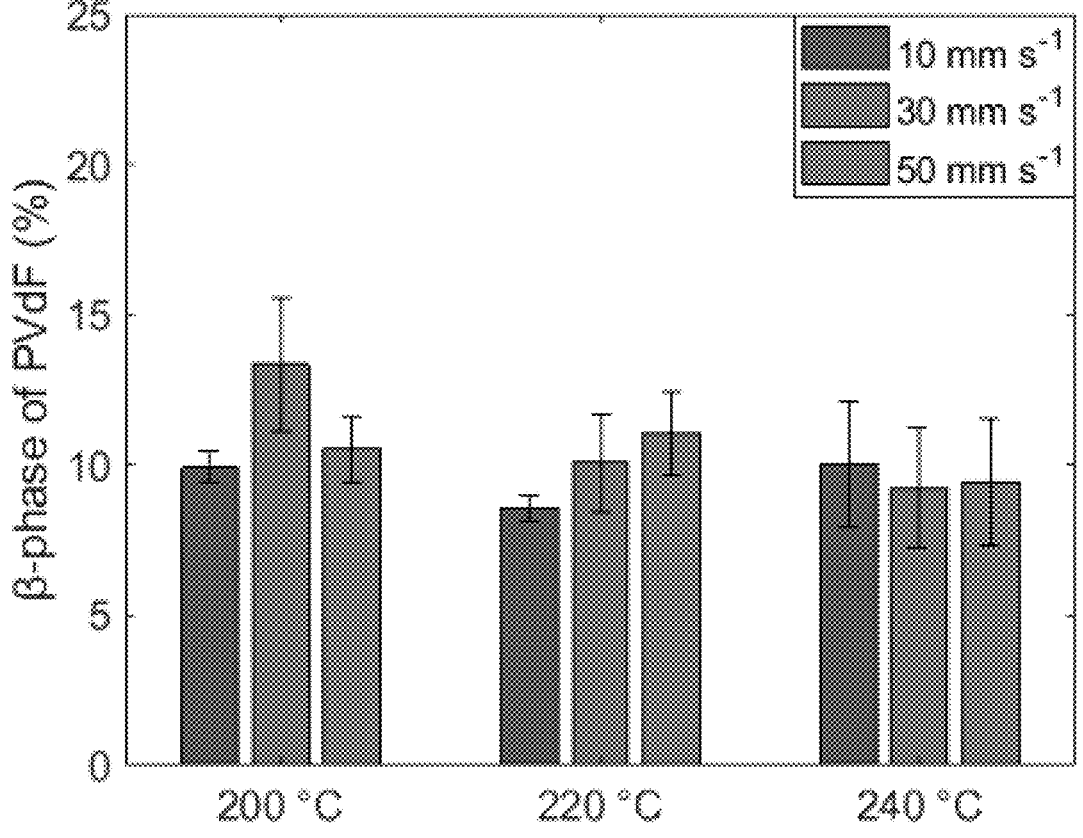
FIGS. 5A through 5C are Fourier transform inferred (FT-IR) spectroscopy characterizations of the β-phase content of 3D-printed PVdF films under different printing parameters.
Figure 5B:
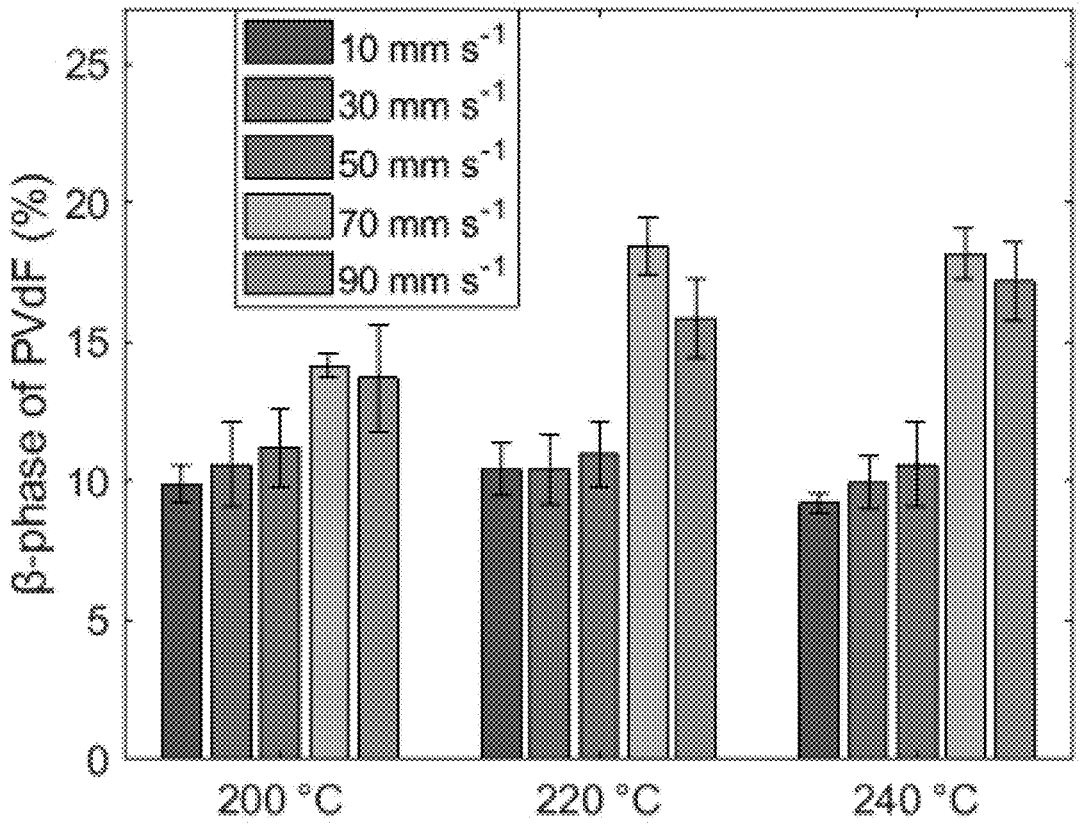
Figure 5C:
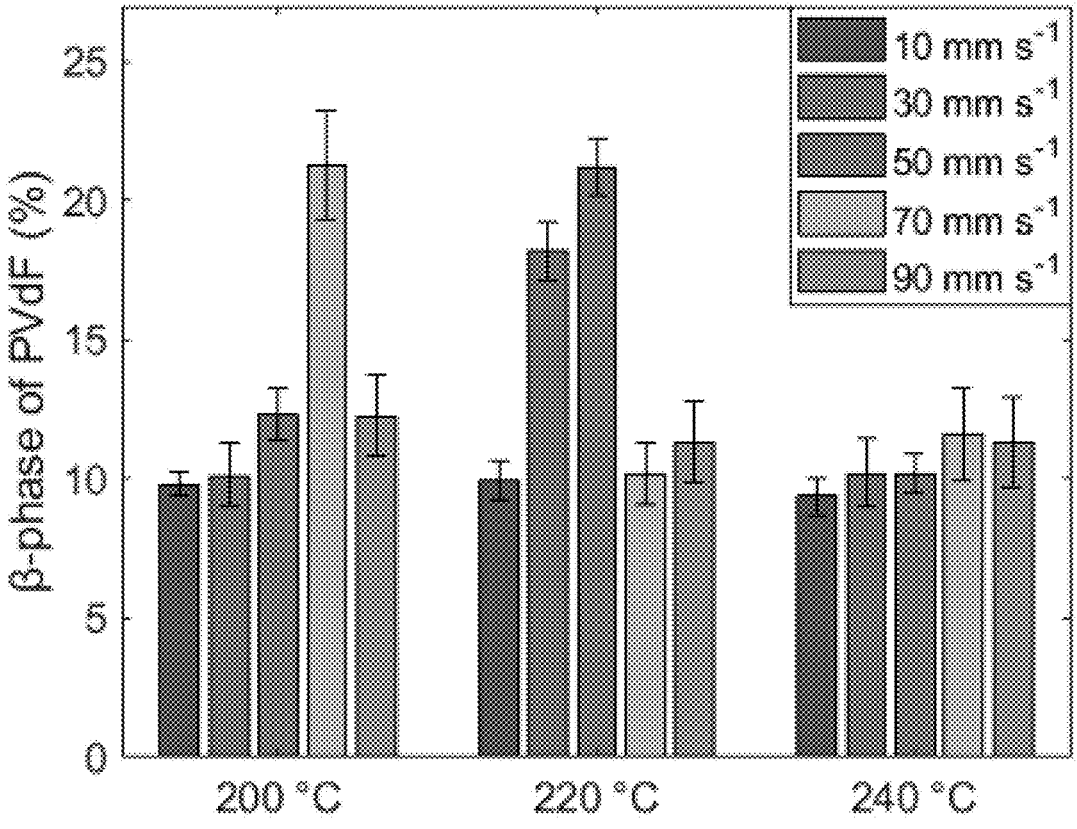

Mechanical drawing of the molten PVdF filament can be utilized to produce a fully 3D-printed flexible PVdF-based capacitive temperature sensor 26 as a result of mechanically stretching the extruded molten PVdF filament by the leading movement of the nozzle 24 during FDM printing, which forces the polymer chains of the molten PVdF material into their most extended possible conformation (i.e., all-trans chains (β-phase)). The influence of printing parameters on the β-phase content was studied via Fourier transform inferred (FT-IR) microscopy. In results plotted in FIGS. 5A through 5C, using a printing bed temperature of 25° C., the highest β-phase content of 21.30% was obtained with a layer height of 0.1 mm, a printing speed of 70 mm s$^{-1}$, and a nozzle temperature of 200° C.

As noted above, the electrodes 28 and 30 are preferably DIW-printed onto the dielectric layer 20 to yield a fully 3D-printed capacitive temperature sensor 26. FIG. 1B schematically represents a DIW printer 32 equipped with a syringe-based printing head in the process of printing one of the electrodes 28. The electrodes 28 and 30 are preferably flexible and adhere well to the dielectric layer 20. Forming the electrodes 28 and 30 of silver was observed to increase surface roughness, which can promote the reliability and durability of the sensor 26. Compared with electrodes formed by manually applying conductive tape (e.g., Cu tape) to a PVdF surface, the printed silver electrodes 28 and 30 were determined to effectively reduce or even eliminate air gaps between the electrodes 28 and 30 and the surfaces of the dielectric layer 20 to which they are applied, which in turn increases the effective contact area of the sensor 26 and improves its sensitivity. Herein, the effective contact area of a capacitive sensor is defined by the area of overlap of the electrodes 28 and 30. The two overlapped electrodes 28 and 30 form a capacitor with the dielectric layer 20 that can store charges and produce voltage potentials.

Figure 3B:
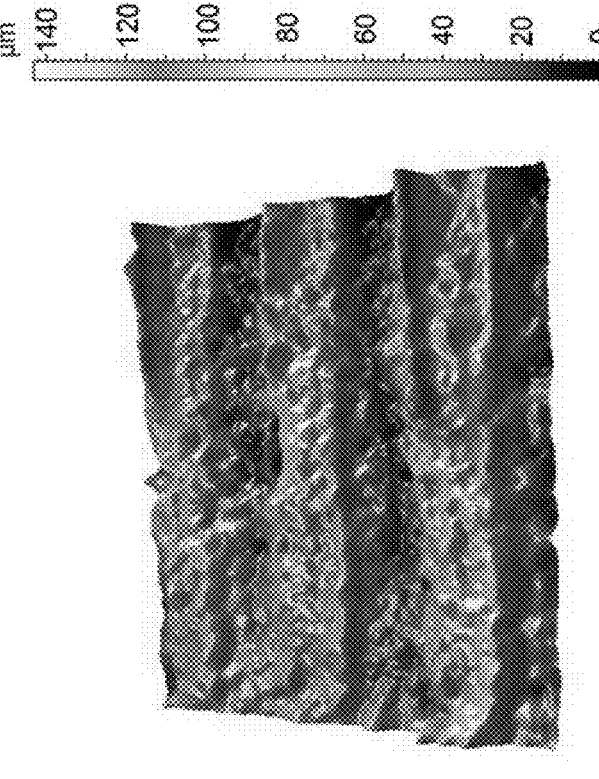
FIG. 3B is a 3D image of confocal microscopy of the PVdF film of FIG. 3A.
Figure 3A:
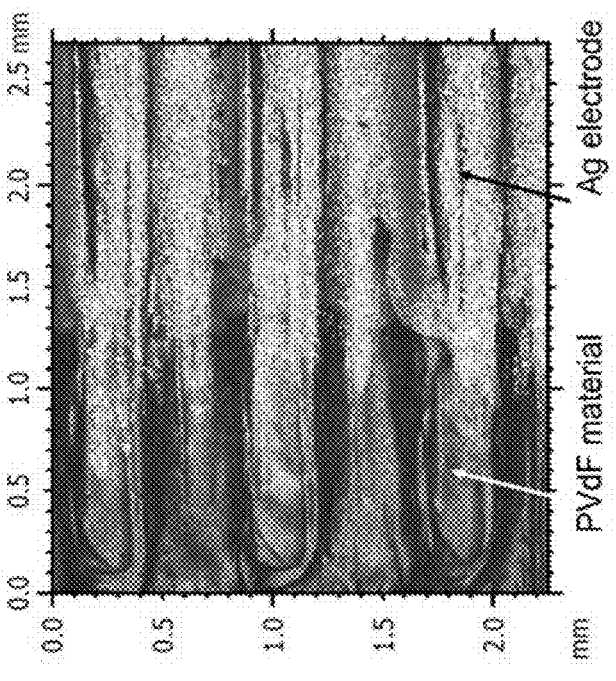
FIG. 3A is a representative optical microscopy image of a top surface of a 3D-printed PVdF film with a printed silver electrode on part of the surface.

The surface morphology of a fully 3D-printed capacitive temperature sensor was characterized through confocal microscopy. The surface morphology characterization results of a representative 3D-printed PVdF film with silver electrodes are depicted in FIGS. 3A-3C and FIGS. 4A-4C for the first and second (top and bottom) surfaces of the sensor, respectively. From FIG. 3A, the gaps between adjacent roads and the resulting cornrow structure of the dielectric layer are primary defects of the surface morphology resulting from the solidification of a high viscosity molten PVdF filament. A Gaussian filter with a 0.8 mm cut-off frequency was applied to remove noise from the 3D image of the confocal microscopy (FIG. 3B). The 3D image visualizes the depth of features on the 3D-printed surface of the dielectric layer across an area of 2.7 mm×2.3 mm. Printing at a nozzle temperature of 240° C., the molten PVdF filament acquired an excellent viscosity and flow rate for printing. Viscosity flow traces are easily seen on the top surface of the 3D-printed PVdF film in FIGS. 3A through 3C.

Applications as a temperature sensor for a capacitive sensor constructed as described above were demonstrated by applying heating-and-cooling cycles from room temperature (25° C.) up to 140° C. while measuring the capacitance as a function of frequency under different temperatures. In these investigations, the sensor exhibited a stable sensitivity of 3 pF ° $C.^{-1}$ at 102 Hz and higher frequencies and improved sensitivities at frequencies higher than 102 Hz after dielectric polarization via a corona poling method described below.

A PVdF filament having a diameter of 1.75 mm was used to print PVdF thin films through an FDM 3D printer, generally as schematically represented in FIGS. 1A through 1C. In the investigations, the FDM 3D printer was a MakerBot Replicator 2X 3D printer (MakerBot Industries, Brooklyn, USA) equipped with an inner ⌊0.4 mm nozzle. The printing bed was covered with a tape material to enhance the adhesion of the printed PVdF thin films on the printing bed surface, thereby promoting the precision of the printing process.

In the investigations leading to the invention, electrodes were printed using a DIW process on the surfaces of the PVdF thin films with a Hydra 16A 3D printer equipped with a syringe-based printing head (Hyrel 3D SDS), generally as represented in FIG. 1B. The electrodes were printed from a conductive ink comprising a fast-drying silver paint (silver flakes suspended in iso-butyl methyl ketone) mixed with a silver paint diluent (iso-butyl methyl ketone) at a volumetric ratio of 1:1. To perform the DIW process, a 1 mL syringe with a needle (18-gauge, outer diameter of 1.27 mm and inner diameter of 0.84 mm) filled with the conductive ink was installed on the syringe-based printing head. In the investigation, a 3D CAD model with dimensions of 60 mm×30 mm×0.2 mm in stereolithography (STL) format was imported into computer-aided manufacturing (CAM) software which converted the 3D CAD model into 3D printing code (e.g., G-code) for a specific series of 3D printers. The 3D printing code was electronically sent to the 3D printer to start and control the printing of the proposed 3D objects.

The PVdF filament was dried at 40° C. for one hour to eliminate the influence of moisture and humidity before the printing process. The major printing parameters, including printing speeds ($v_p$), nozzle temperature ($T_p$), first layer height $h_p$, and printing bed temperature $T_b$ were established using printing software that was also used for slicing and G-code generation. During the FDM process, the PVdF filament was fed into a heater through rollers, and the filament is melted at $T_p$ and extruded from a moving nozzle with an inner diameter of 0.4 mm. The movement of the nozzle was controlled by the computer program based on the G-code imported from the software. The printing speed, which was also the moving speed of the nozzle, was established as a variable in the software.

For the nonlimiting investigation, the 3D-printed capacitors had a single printed PVdF thin film that formed the dielectric layers of the capacitors. Thus, the height $h_p$ of the printed PVdF thin film determined the thickness of the dielectric layer in the sensors. In the investigation, all PVdF thin films were printed with a 50% overlap and 95% infill density. The gap between the nozzle and the printing bed was calibrated and adjusted to 200 μm. Once the printing was complete, the printed films were manually removed from the printing bed and pressed in the thickness direction to avoid deformation caused by the shrinkage while cooling down to room temperature (25° C.).

The FDM 3D printing process used in the investigation incorporated conditions in conventional piezoelectric PVdF manufacturing, specifically stretching the polymeric materials under elevated temperature by which polymer chains are forced into their most extended conformation (β-phase conformation) in order to increase the β-phase content, as known in the art. The printing parameters in the FDM 3D printing process were optimized to promote the β-phase content in the PVdF thin films. Depending on the desired properties of the sensor, various other parameters may be utilized to influence the β-phase content of printed PVdF films, and therefore the dielectric layers of capacitive sensors formed with the films.

For one set of test samples, the height of the PVdF film was 0.2 mm, and the printing bed temperature was 70° C. The nozzle temperatures were 200° C., 220° C., and 240° C. and the printing speeds were 10 mm $s^{-1}$, 30 mm $s^{-1}$, and 50 mm $s^{-1}$. The influence of changes in these variables on the β-phase content of the PVdF films were studied while all other parameters were kept constant except as noted previously. There were nine groups in total, and nine samples in each group were printed under the specified printing parameters listed in Table 1.

TABLE 1

Printing parameters of the 3D printing process for PVdF films (0.2
mm as the first layer height and 70° C. as nozzle temperature)

| Group # | Nozzle temperature (° C.) | Printing speed (mm s$^{-1}$) |
|---|---|---|
| 1 | 200 | 10 |
| 2 | 200 | 30 |
| 3 | 200 | 50 |
| 4 | 220 | 10 |
| 5 | 220 | 30 |
| 6 | 220 | 50 |
| 7 | 240 | 10 |
| 8 | 240 | 30 |
| 9 | 240 | 50 |

For a second set of test samples, the height of the PVdF film was 0.2 mm and the printing bed temperature was reduced to room temperature (25° C.). Again, the nozzle temperatures were 200° C., 220° C., and 240° C. The printing speed was assumed to have a large effect on β-phase content, so additional speeds were tested. including 10 mm s$^{-1}$, 30 mm s$^{-1}$, 50 mm s$^{-1}$, 70 mm s$^{-1}$, and 90 mm s$^{-1}$. In the second set, there were fifteen groups in total, and nine samples in each group were printed under the specified printing parameters listed in Table 2.

TABLE 2

Printing parameters of the 3D printing process for PVdF films (0.2
mm as the first layer height and 25° C. as nozzle temperature)

| Group # | Nozzle temperature (° C.) | Printing speed (mm s$^{-1}$) |
|---|---|---|
| 10 | 200 | 10 |
| 11 | 200 | 30 |
| 12 | 200 | 50 |
| 13 | 200 | 70 |
| 14 | 200 | 90 |
| 15 | 220 | 10 |
| 16 | 220 | 30 |
| 17 | 220 | 50 |
| 18 | 220 | 70 |
| 19 | 220 | 90 |
| 20 | 240 | 10 |
| 21 | 240 | 30 |
| 22 | 240 | 50 |
| 23 | 240 | 70 |
| 24 | 240 | 90 |

A third set of test samples was prepared in which the PVdF films were printed as thin as possible under the test conditions. The height of the PVdF film was 0.1 mm while all other parameters were kept the same as the second set of test samples. There were fifteen groups with nine samples in each group printed in the third sample set. The printing parameters of each group are specified in Table 3.

TABLE 3

Printing parameters of the 3D printing process for PVdF films (0.1
mm as the first layer height and 25° C. as nozzle temperature)

| Group # | Nozzle temperature (° C.) | Printing speed (mm s$^{-1}$) |
|---|---|---|
| 25 | 200 | 10 |
| 26 | 200 | 30 |
| 27 | 200 | 50 |
| 28 | 200 | 70 |
| 29 | 200 | 90 |
| 30 | 220 | 10 |

TABLE 3-continued

Printing parameters of the 3D printing process for PVdF films (0.1
mm as the first layer height and 25° C. as nozzle temperature)

| Group # | Nozzle temperature (° C.) | Printing speed (mm s$^{-1}$) |
|---|---|---|
| 31 | 220 | 30 |
| 32 | 220 | 50 |
| 33 | 220 | 70 |
| 34 | 220 | 90 |
| 35 | 240 | 10 |
| 36 | 240 | 30 |
| 37 | 240 | 50 |
| 38 | 240 | 70 |
| 39 | 240 | 90 |

For the investigations, electrodes were printed on the PVdF films using a 1 mL syringe with a needle (18-gauge, outer diameter 1.27 mm and inner diameter 0.84 mm) installed on a syringe-based printing head of a DIW printer. Printing parameters including printing speed, flow rate, later height, and movement controlled by a computer. Printing parameters were tuned based on the surface quality and electrical continuity of the DIW printed electrodes. The conductive ink used to print the electrodes on both surfaces of the PVdF films had the composition as previously described.

For the FDM 3D printing process of the PVdF films, the contact area between adjacent roads of the extruded molten filament after solidification was referred to as the bonding surface. The road profile was an elliptical curve. The surface angle, cross-sectional shape, overlap between adjacent roads, and film thickness were factors that influenced the surface quality of the films. The average surface roughness ($R_a$) measured from the top surface of the 3D-printed PVdF films without and with electrodes are 7.30 μm and 12.90 μm, respectively. However, $R_a$ cannot provide information about peak shape and wavelength, which means that no distinction could be made between peaks and valleys from $R_a$. Many other surface parameters can be chosen to characterize the 3D-printed surface to identify specific features on the film surface. Certain parameters used are classified into amplitude, shape, and spacing parameters in Table 4. The root mean square roughness ($R_q$) is more sensitive to occasional deep valleys or high peaks, which is helpful to characterize the sudden appearance of defects on 3D-printed surfaces. In investigated 3D-printed PVdF films, the $R_q$ values for the sample surfaces without and with silver electrodes were 9.17 μm and 16.50 μm, respectively.

One of the critical challenges of 3D printing electrically conductive inks is that gaps or the cornrow structure on the surface of a 3D-printed film can cause an open circuit or discontinuity of electrical conductivity. The diameter of a deposited road, the percentage of overlapping of adjacent roads, and the deposited layer height can determine the surface quality of the top surface of a 3D-printed sample film. Among shape parameters, skewness and kurtosis are useful indicators of symmetry and flatness of the amplitude density distribution, respectively. The skewness ($R_{sk}$) values of the top sample surfaces were −0.358 and 1.020 for surfaces without and with silver electrodes, respectively. In the investigation, kurtosis ($R_{ku}$) values were 2.41 and 3.24, measured from the surface without and with silver electrodes, respectively.

Figure 3C:
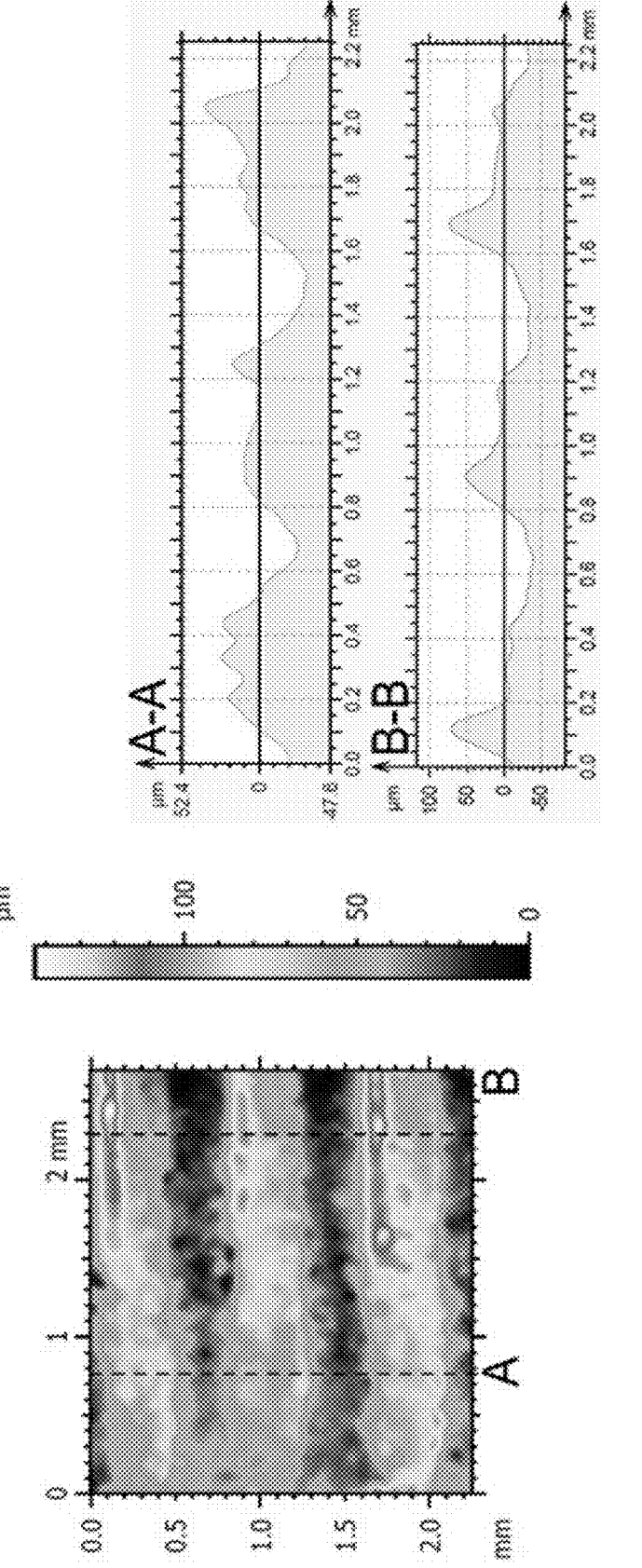
FIG. 3C relates to a profile analysis of the top surface of the PVdF film of FIG. 3A.

The mean spacing between peaks ($S_m$) can approximately reflect the spacing between periodic features. Due to the presence of periodic features (e.g., the roads), the $S_m$ values are very useful to characterize the dominant width of a periodic feature, such as the width of a road. In the investigations, the widths of the roads that solidified from the molten filament extruded from a nozzle with an inner diameter of 0.4 mm was approximately 0.4 mm. The $S_m$ value calculated from the profile positioned at "A-A" in FIG. 3C is 0.423 mm, which is consistent with the inner diameter of the nozzle used.

Figures 4A, 4B:
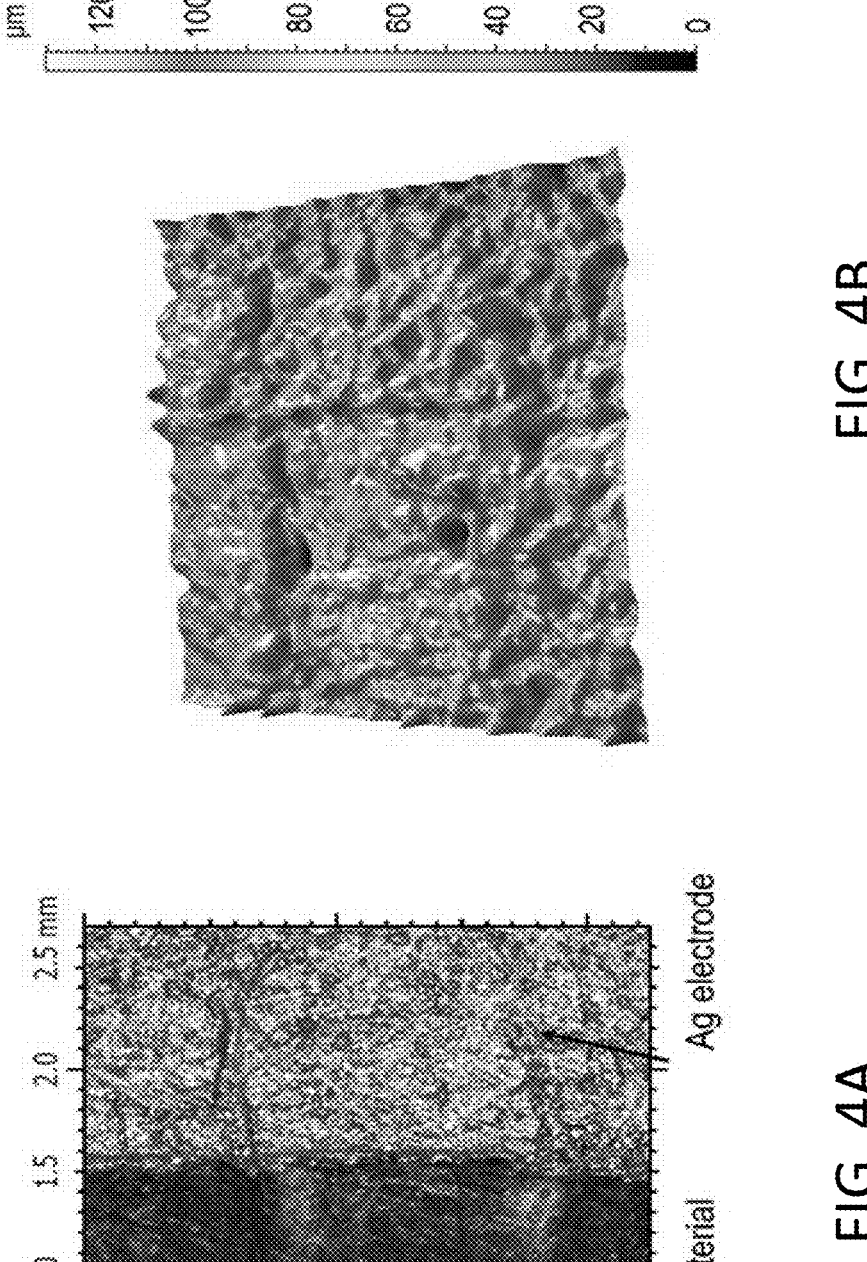
FIG. 4A is a representative optical microscopy image of a bottom surface of a 3D-printed PVdF film with a printed silver electrode on part of the surface.
FIG. 4B is a 3D image of confocal microscopy of the PVdF film of FIG. 4A.
Figure 4C:
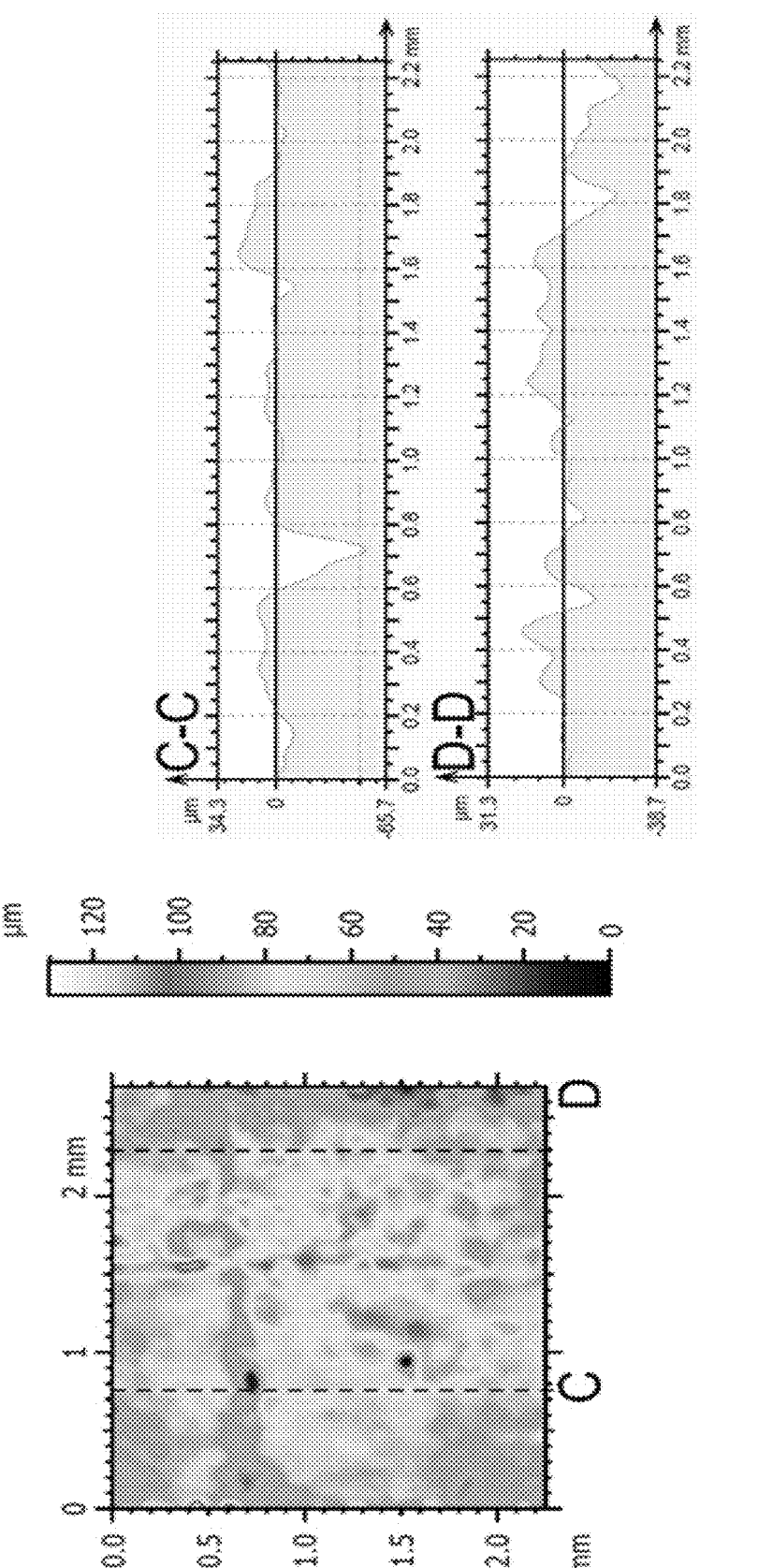
FIG. 4C relates to a profile analysis of the bottom surface of the PVdF film of FIG. 4A.

The surface morphology characterizations of the bottom surfaces of the FDM 3D-printed PVdF films are shown in FIGS. 4A-4C, and the major surface roughness parameters are listed in Table 4. The bottom surface of each printed PVdF film is the interface between the film and the flat surface of the printing bed. Compared to the top surfaces of the films, the bottom surfaces had a lower average surface roughness ($R_a$) and lower mean roughness depth ($R_z$). The characteristics of the bottom surfaces corresponded to the surface roughness of the printing bed. Since no outstanding features appear on the profile of the bottom surface except the sudden appearance of a defect (i.e., a "valley") at the profile "C-C" positioned at about 0.75 mm, the shape parameters and spacing parameters did not reflect the profile features of the bottom surfaces.

TABLE 4

Surface roughness parameters for a 3D-printed PVdF film and silver electrodes.

| | Amplitude parameters | | | | Spacing parameters Meaning |
|---|---|---|---|---|---|
| | Average roughness | Mean roughness | Shape parameters | | spacing between |
| Profile position | $R_a$ ($\mu$m) | depth $R_z$ ($\mu$m) | Skewness $R_{sk}$ | Kurtosis $R_{ku}$ | peaks $S_m$ (mm) |
| A-A | 7.30 | 35.40 | −0.358 | 2.41 | 0.423 |
| B-B | 12.90 | 61.40 | 1.020 | 3.24 | 0.399 |
| C-C | 9.52 | 55.4 | −1.700 | 5.20 | 0.407 |
| D-D | 4.74 | 28.8 | −0.436 | 3.25 | 0.270 |

The general repeating formula of PVdF polymer chains contains two fluorine and two hydrogen atoms per repeat. PVdF polymer chains can adopt at least three regular conformations, which are all-trans (tttt), trans-gauche$^+$-trans-gauche$^-$ (tg$^+$tg$^-$), and tttg$^+$tttg$^-$ corresponding to $\alpha$-, $\beta$- and $\gamma$-phases. A thermally stable $\alpha$-phase is commonly obtained by crystallization from the melting process but is not a preferred phase for application in a capacitive sensor. Therefore, the investigations sought to account for this in order to maximize the $\beta$-phase in the dielectric layers produced.

During the FDM 3D printing process, the PVdF material starts to degrade and break down at a nozzle temperature above 290° C. Therefore, the extruder nozzle temperature was set to temperatures lower than 290° C. to avoid degradation or losses of electrical and mechanical properties. Heating and mechanical extrusion may cause a breakdown of the original spherulitic structure into an array of crystallites whose polymer chains are aligned in parallel with the direction of extrusion. After the molten PVdF filament extrudes from the nozzle, the filament starts to lose heat and the temperature of the extruded filament decreases continuously. The molten filament is intentionally subjected to mechanical stretching as described previously, and begins to deform due to the leading movement of the nozzle. When such deformation occurs at high temperatures (e.g., 140° C.

to 150° C.), the original $\alpha$-phase polymer chains are free to slide past each other without altering the chain conformation. The resulting chain conformation is still the $\alpha$-phase. However, drawing at temperatures well below the melting point of a PVdF material (about 90° C.), where the polymer is much stiffer, can cause chain packing of the molecules into the most extended possible conformation (i.e., $\beta$-phase). The printed PVdF filaments on the printing bed surface were heated to 70° C. resulting in a phase transformation from the $\beta$-phase to the thermally stable $\alpha$-phase. In is also within the scope of the invention to reduce the bed temperature to 25° C. to slow down the phase transformation and obtain more $\beta$-phase in the printed PVdF film. As stated previously, the highest $\beta$-phase content (21.30%) appeared at a nozzle temperature of 200° C. and a printing speed of 70 mm/s.

Figure 6A:
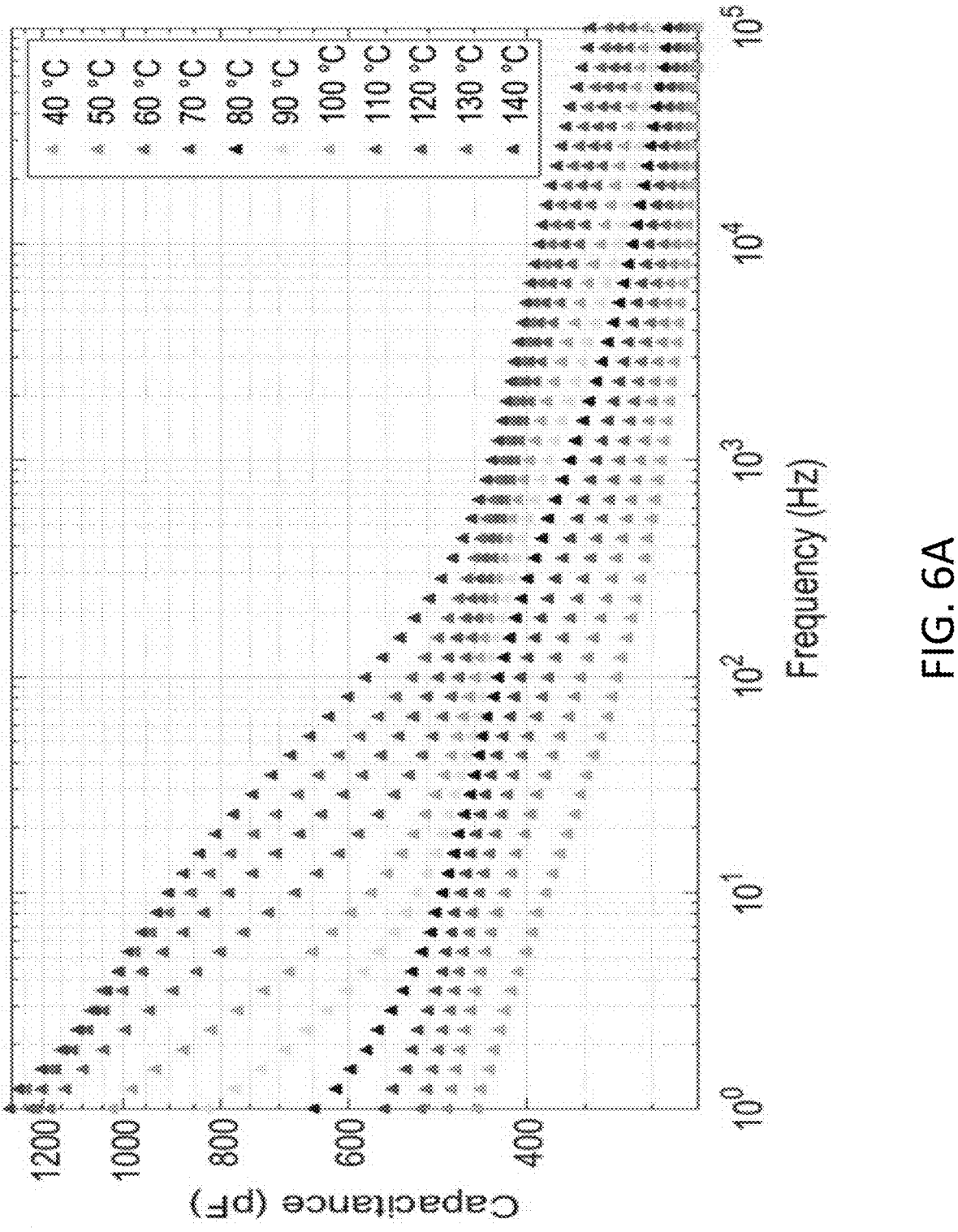
FIG. 6A is a graph plotting capacitance of a representative fully 3D-printed PVdF-based capacitive temperature sensor as a function of frequency subjected to heat treatments from 40° C. to 140° C. in increments of 10° C.
Figures 6B, 6C, 6D, 6E, 6F, 6G:
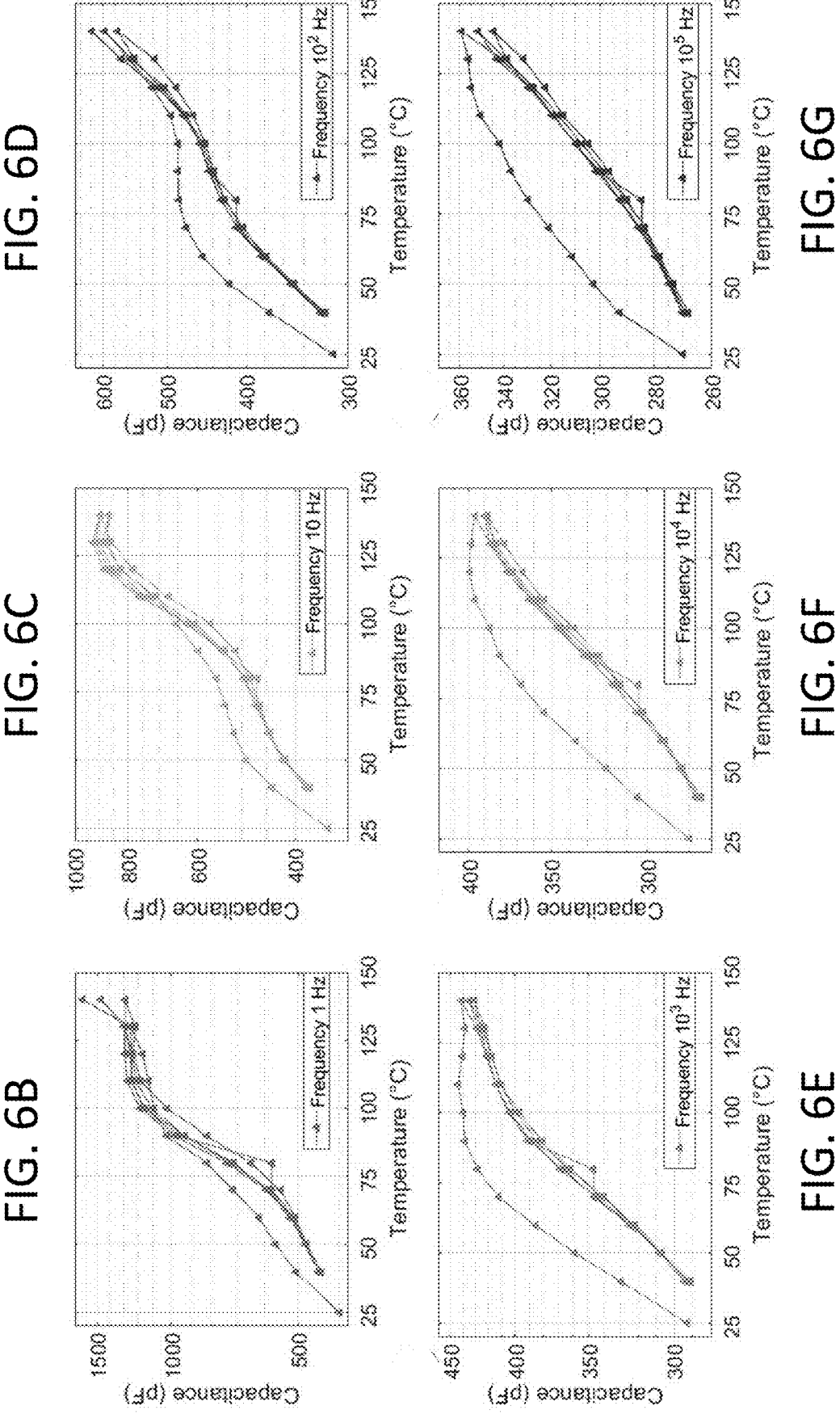
FIGS. 6B-6G show the capacitance of the temperature sensor subjected to heating-cooling cycles varied from 25° C. to 140° C. in increments of 10° C. characterized at different frequencies, namely: 1 Hz in FIG. 6B, 10 Hz in FIG. 6C, 102 Hz in FIG. 6D, 103 Hz in FIG. 6E, 104 Hz in FIG. 6F, and 105 Hz in FIG. 6G.

The characterization results of a representative fully 3D-printed PVdF-based capacitive temperature sensor produced during the investigation are illustrated in FIGS. 6A through 6G. The capacitance of the capacitive temperature sensor as a function of frequency was measured under a heating and cooling treatment from 40° C. to 140° C. with temperature increments of 10° C. (shown in FIG. 6A). Results shown in FIG. 6B-6G correspond to the capacitance of the capacitive temperature sensor subjected to heating-cooling cycles (varied from 25° C. to 140° C. in an increment of 10° C.) characterized at different frequencies: 1 Hz (FIG. 6B), 10 Hz (FIG. 6C), 102 Hz (FIG. 6D), 103 Hz (FIG. 6E), 104 Hz (FIG. 6F), and 105 Hz (FIG. 6G). The curves describing the capacitance of the capacitive temperature sensor as a function of temperature appear in different shapes at different frequencies. The variation of the capacitance as a function of temperature is divided into two stages, including the initial stage and a stable stage. The initial stage corresponds to the capacitance measured during the heating process in the first heating-and-cooling cycle. The capacitance measured during the cooling process of the first thermal treatment cycle and the rest of the two heating and cooling cycles are defined as the stable stage. The capacitances measured at the initial stage were much higher than those measured at the stable stage at the same temperatures, which became a general rule for the variations of capacitance measured at all six frequencies tested. In the stable stage, the capacitance variations measured under different thermal cycles nearly followed the same paths. The path was a hysteresis loop, which describes the dependence of the capacitance on the thermal history of the capacitive temperature sensor. Similar to elastic hysteresis, for example, the area in the center of the hysteresis loop is the energy loss. The capacitance variations measured at all six frequencies of interest show a narrow hysteresis feature. A narrow hysteresis loop implies a small amount of dissipated energy in repeated heating and cooling cycles.

Analysis of the data in FIGS. 6B-6E showed a non-linear positive relation between the capacitance and the temperature at frequencies lower than 104 Hz. The functions measured at 1 Hz, 10 Hz, and 102 Hz showed S-shaped growth curves. In FIG. 6B, the capacitance of the capacitive temperature sensor increased slowly, initially from 40° C. to 70° C. The capacitance grew rapidly, approaching an exponentially increasing rate as in a J-shaped curve, but then the increasing rate slowed until the temperature reached 140° C. The capacitive temperature sensor measured at 10 Hz showed a more considerable capacitance change when temperatures were varied in the range of about 80° C. to about 120° C., as shown in FIG. 6C. For the measurement performed at 102 Hz shown in FIG. 6D, the rate of capacitance change was relatively slow in the range of about 80° C. to about 100° C. compared with the rate outside this temperature range. When the capacitance was measured at 103 Hz, the capacitive temperature sensor showed a larger capacitance change for temperatures lower than 90° C. than for temperatures higher than 90° C. (FIG. 6E). The variation of capacitance showed a linear position correlation with the temperature at both 104 Hz and 105 Hz (FIGS. 6F and 6G).

Figures 7A, 7B, 7C, 7D:
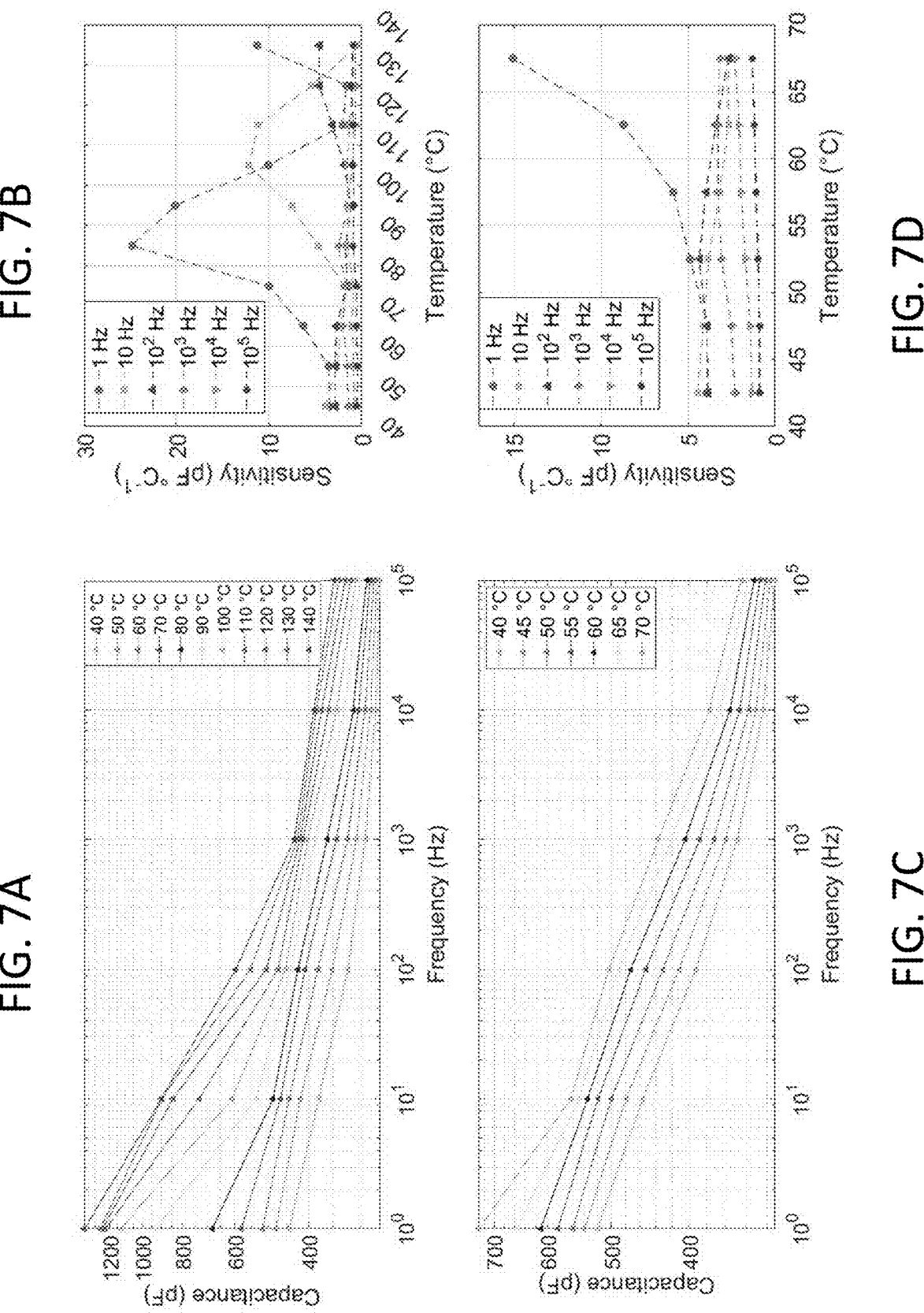
FIGS. 7A through FIG. 7D are graphs plotting capacitance or sensitivity of a representative fully 3D-printed PVdF-based capacitive temperature sensor as a function of frequency at different temperature ranges, namely: capacitance and sensitivity at temperatures of 40° C. to 140° C. in 10° C. increments (FIGS. 7A and 7B), and capacitance and sensitivity at temperatures of 40° C. to 70° C. in 5° C. increments (FIGS. 7C and 7D).

The capacitance of the fully 3D-printed capacitive temperature sensor as a function of frequency measured at the stable stage of the thermal treatment is shown in FIG. 7A. The characterization results in FIG. 7A show a monotonic, inversely proportional relationship between capacitance and measurement frequency. It also explains the working principle of the capacitive temperature sensor. The capacitance of the tested capacitive temperature sensor increased with the increase in temperature, which indicated the capacitance has a positive correlation with temperature at a specific constant frequency (e.g., 1 Hz, 10 Hz, etc.). The relationship was measured and plotted in FIGS. 6B-6G and described above. The capacitance had a positive linear correlation with temperature at the high-frequency range of 104 Hz to 105 Hz. Additionally, the capacitance decreased as the increase of frequency at a constant temperature shown in FIG. 7A. The capacitive temperature sensor's sensitivity was calculated based on the data in FIG. 7A and plotted in FIG. 7B. The sensitivities exhibited more pronounced changes in the low-frequency range of 1 Hz to 10 Hz, and the sensitivities became stable when the frequency increased to 102 Hz and even higher. When the capacitive temperature sensor was measured at 1 Hz, the sensitivity increased from 4 pF $° C.^{-1}$ at the temperature range of 40° C. to 50° C. to a peak value of 25 pF $° C.^{-1}$ at 80° C. to 90° C. The sensitivity then decreased with increasing temperature until about 130° C. The sensitivity as a function of temperature measured at 1 Hz did not show a bell shaped curve because the temperature increased to 12 pF $° C.^{-1}$ in the range of 130° C. to 140° C. The sensitivity at 10 Hz showed a bell shaped curve, which increased from 4 pF $° C.^{-1}$ at 40° C. to 50° C. to a peak value of 12.5 pF $° C.^{-1}$ at 100° C. to 110° C. and then decreased to 1 pF $° C.^{-1}$ in the range of 130° C. to 140° C. For the sensitivity of the capacitive temperature sensor measured at 102 Hz or higher, variations of sensitivity with the changing of temperature indicated the sensitivity is independent of temperature. The capacitive temperature sensor's sensitivities maintained values of 3 pF $° C.^{-1}$ at 102 Hz and 2 pF $° C.^{-1}$ at 103 Hz and higher frequencies.

The tested capacitive temperature sensor's performance in a relatively low-temperature range of 40° C. to 70° C. was also demonstrated. The variation of capacitance as a function of frequency measured at different temperatures varied from 40° C. to 70° C. with 5° C. as the increment is shown in FIG. 7C. The capacitance monotonically decreased with the frequency increase at all tested temperatures without exception. The capacitive temperature sensor's sensitivity was based on data shown in FIG. 7C. When the capacitive temperature sensor was tested at the temperature range of 40° C. to 70° C., the temperature-sensitivity relation curves were almost horizontal except for the data measured at 1 Hz. The sensitivity at 1 Hz increased with the temperature increase following a J-shape trend and reached a value of 15 pF $° C.^{-1}$ in the range of 65° C. to 70° C. Comparing the variations of sensitivities of the capacitive temperature sensors measured at different temperature ranges (see FIGS. 7B and 7D), the sensitivity of both capacitive temperature sensors was stable at frequencies higher than 102 Hz and increased with increasing temperature at the beginning at 1 Hz. For the capacitive temperature sensor tested in the range of 40° C. to 140° C. at 1 Hz, the sensitivity increased with increasing temperature until reaching a peak value of 25 pF $° C.^{-1}$ in the range of 80° C. to 90° C. This increasing trend can also be seen for the capacitive temperature sensor tested in the relatively small temperature range (i.e., 40° C. to 70° C.).

The capacitance of a representative fully 3D-printed PVdF-based capacitive temperature sensor as a function of frequency subjected to different bending radius was measured at ambient temperature (25° C.). The capacitive temperature sensor was subjected to different bending radii which varied from bending free state (i.e., infinite bending radius) to 0.25 cm as the minimum bending radius and the results are shown in the inset of FIG. 8D. The average relative capacitance changes ($\Delta CC$) of six devices as a function of the bending radius at different frequencies were measured and calculated as shown in FIG. 8D.

Figure 8A:
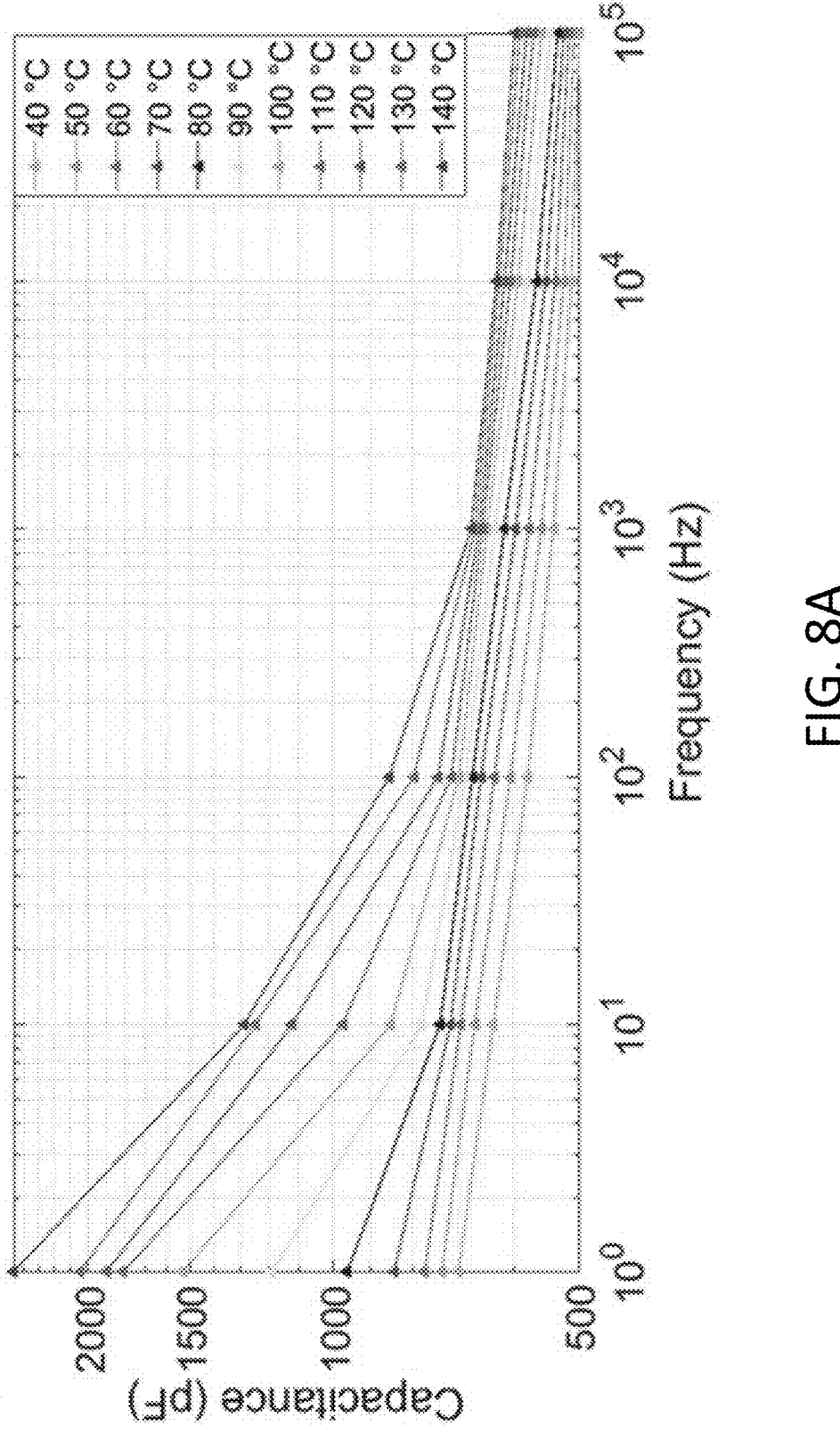
FIG. 8A is a graph plotting capacitance of a representative fully 3D-printed corona poled PVdF-based capacitive temperature sensor as a function of frequency.
Figure 8B:
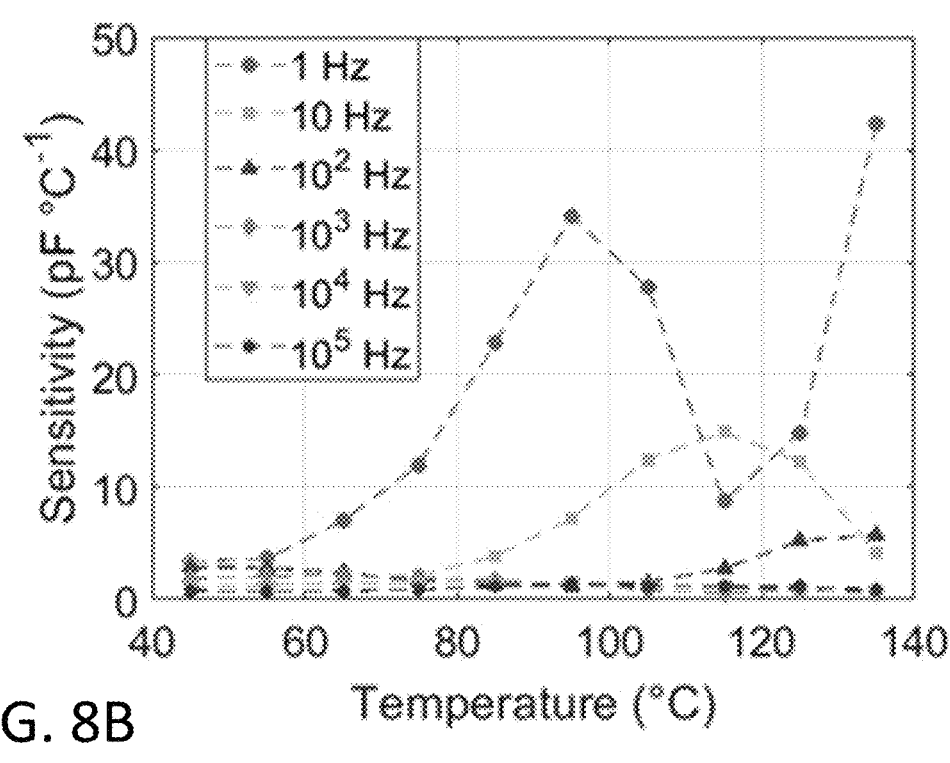
FIG. 8B shows sensitivity as a function of temperature measured at different frequencies.
Figure 8C:
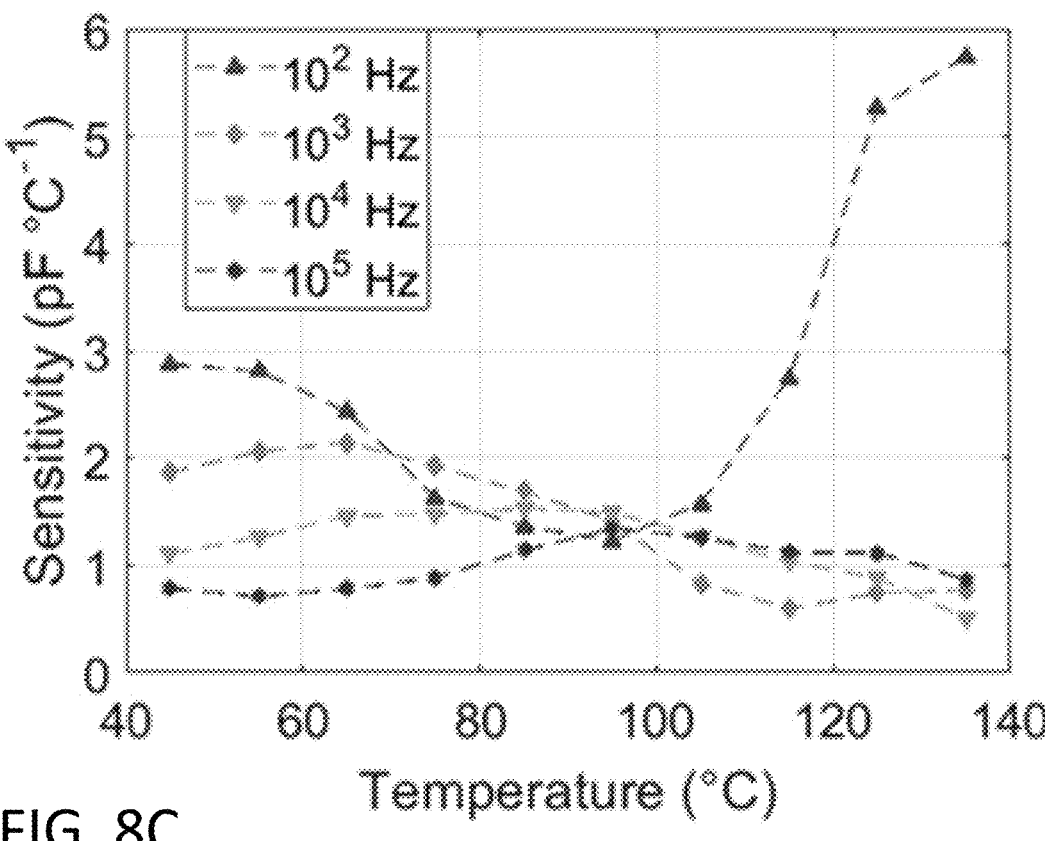
FIG. 8C shows a zoomed portion of sensitivity measured at 102 Hz and higher.
Figure 8D:
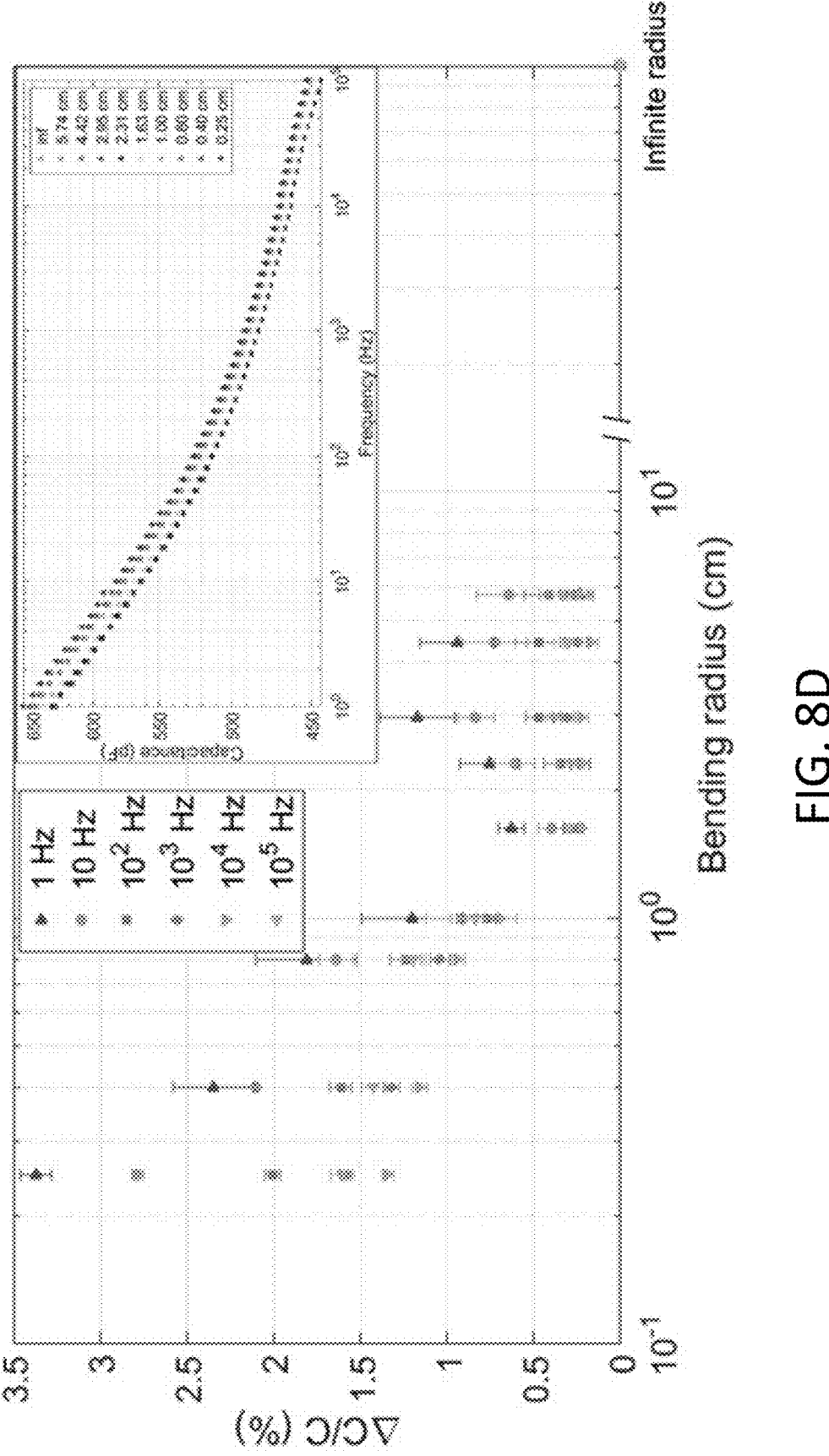
FIG. 8D is a graph plotting capacitance of a representative sensor as a function of frequency subjected to different bending radii from a bending free state (Inf.) to 0.25 cm at ambient temperature (25° C.) and the average relative capacitance change (ΔCC) as a function of the bending radius at different frequencies.
Figures 9A, 9B, 9C, 9D:
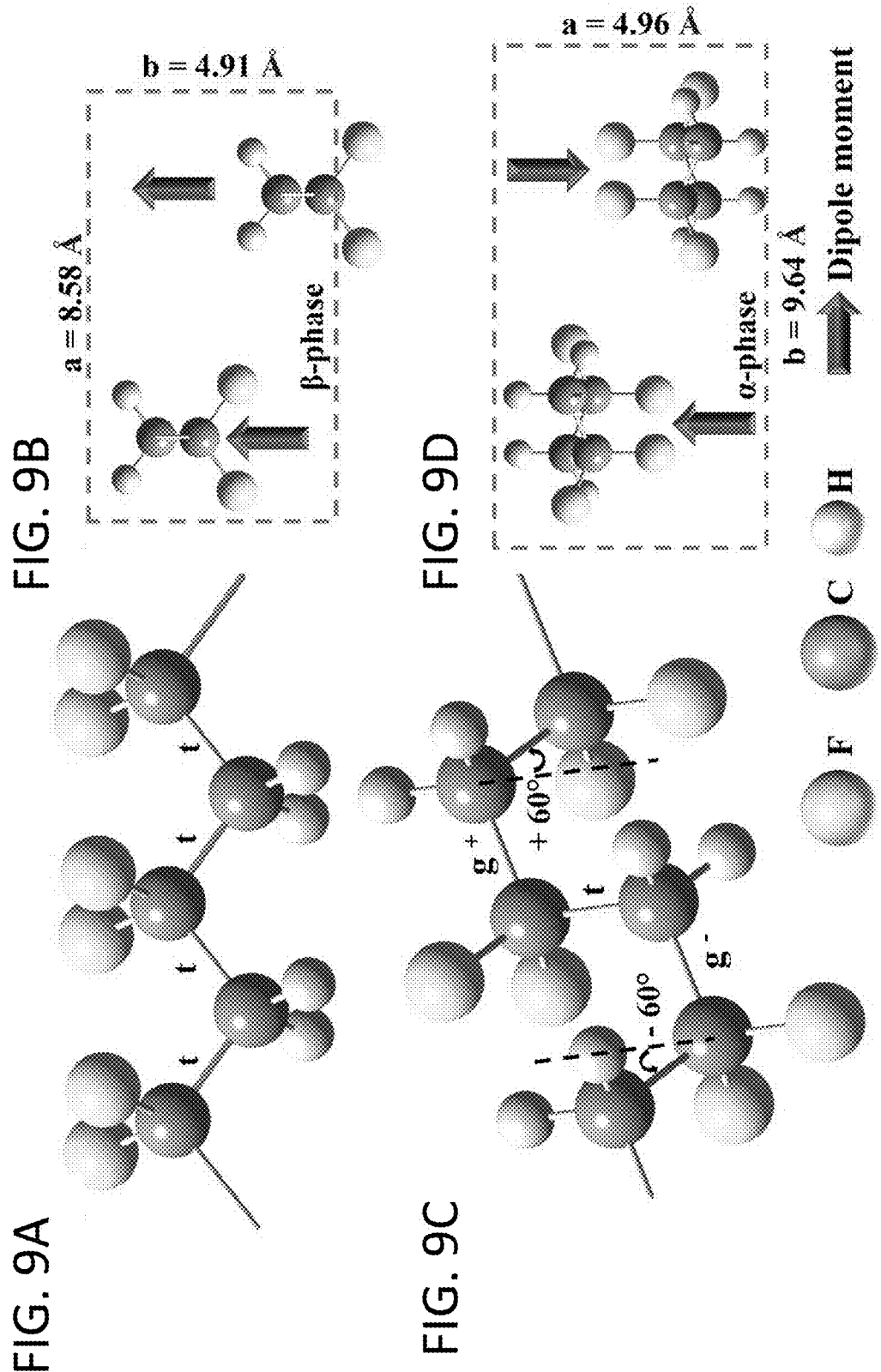
FIGS. 9A through 9D contain schematic representations of poly(vinylidene fluoride) polymer chain segments in different conformations, namely: the β-phase (tttt) in FIG. 9A, the α-phase ($g^+tg^-t$) in FIG. 9B, unit cells of the β-phase in FIG. 9C, and unit cells of the α-phase in FIG. 9D.

Additional polarization increases the dielectric constant; thus, the capacitance of a PVdF-based capacitive temperature sensor increases, which was verified via experimental results with a PVdF-based capacitive temperature sensor after corona poling as shown in FIG. 8A. Compared with the data shown in FIG. 7A, the capacitance of a PVdF-based capacitive temperature sensor after polarization was higher than that of an unpoled capacitive temperature sensor measured at the same temperature and frequency. Poled and unpoled sensors were printed following the same procedures using the same 3D printer. Therefore, any increase in capacitance was caused by a polarization effect in the PVdF material. FIG. 8A shows that the capacitance as a function of frequency still followed a monotonically decreasing trend at all temperatures, which is also as same as the principle established in FIGS. 7A and 7C corresponding to unpoled PVdF capacitive temperature sensors measured at temperature ranges of 40° C. to 140° C. and 40° C. to 70° C., respectively.

Figures 2A, 2B:
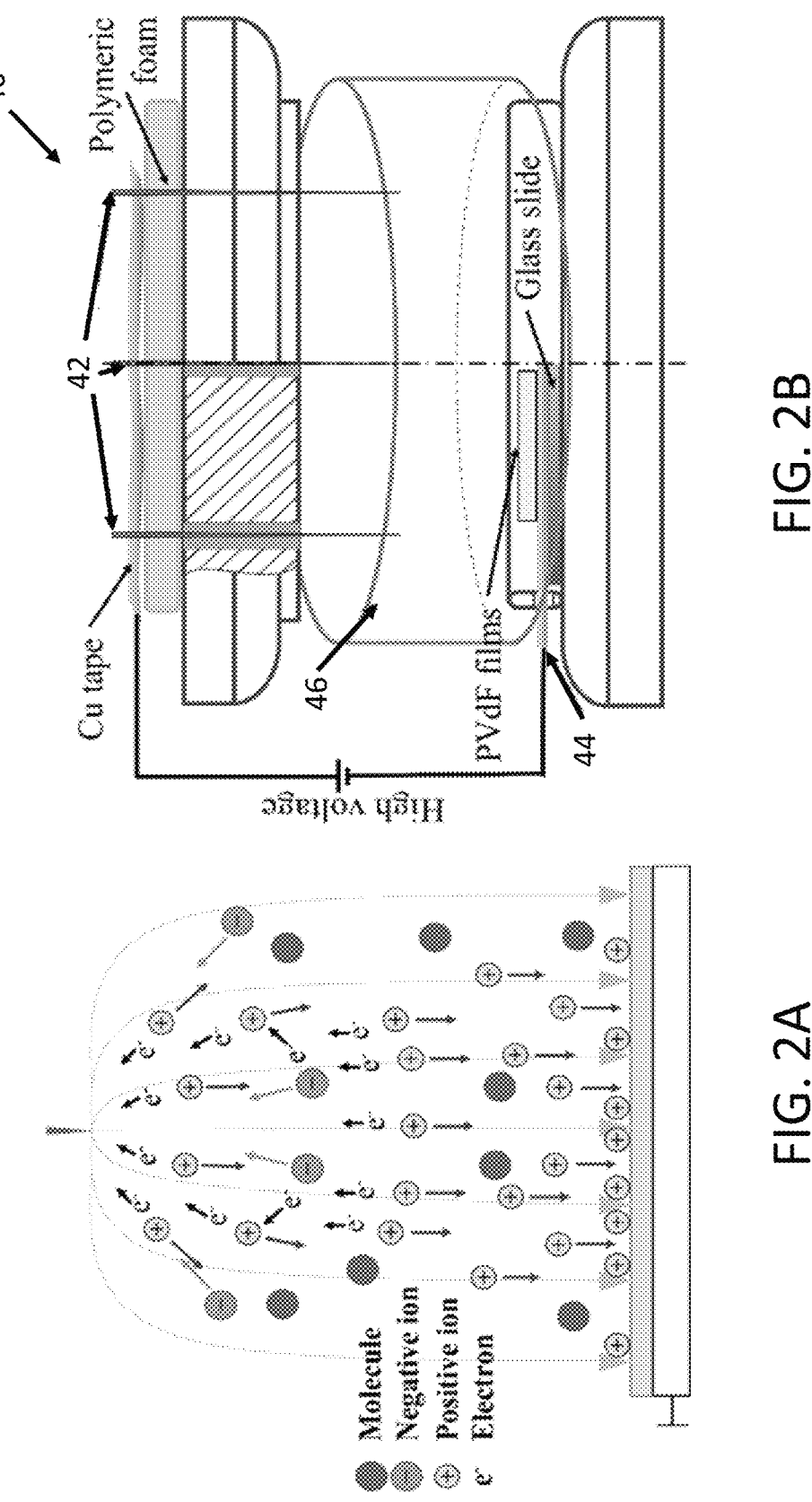
FIG. 2A is a schematic of a positive corona discharge in a point-to-plane geometry.
FIG. 2B is a schematic of a corona poling apparatus.

Polarizing a dielectric layer of a capacitive sensor formed by a PVdF film may be achieved in a separate process from printing the PVdF film using a corona poling apparatus 40 such as represented in FIGS. 2A and 2B. FIG. 2B schematically represents the corona poling apparatus 40 and FIG. 2A schematically represents a corona discharge generated by the corona poling apparatus 40. Corona poling creates a high electric field across PVdF films to realize polarization in the films without causing a dielectric breakdown. In some cases, the corona poling apparatus 40 can eliminate the need to deposit electrodes on the surfaces of the dielectric layer 20. As represented, the corona poling apparatus 40 comprises a plurality of needles 42 as ionizers (anode) and a metal plate electrode (cathode) 44 grounded as the receiver of the ions. The space defined by the needles 42 and the cathode 44 receives the object to be polarized.

In a single-needle-to-plane configuration, the electric static field strength decreases gradually in the direction away from a needle 42. Thus, in the represented embodiment, the setup of the corona poling apparatus 40 includes a multi-needle-to-plane configuration comprising six needles in a 2×3 configuration to obtain a static electric field with a desired homogeneity. The needles 40 were stainless-steel with a tip radius r=0.03 mm. The needle-to-needle spacing was 25.4 mm, and the distance between the needle tip and the cathode 44, referred to as the needle height, was 12 mm, thereby defining a sample location between the ionizer needles 42 and the cathode 44 that was configured to receive an object to be polarized.

A shield 46 was installed to focus ions created during corona discharge towards the sample surfaces. In the non-limiting embodiment represented in FIG. 2B, the shield 46 is comprised of poly(ethylene terephthalate) (PET). During the corona discharge, the interior surface of the PET shield was electrically charged and served as a lens to reflect the ions to the center area of the corona discharge.

In investigations leading to the invention, the voltage applied was a positive direct current (DC) voltage (7 kV) and the voltage applied to the needles 42 was the same. Samples were placed on the surface of the cathode 44 and subjected to corona poling for forty-five minutes at room temperature (25° C.) to realize polarization.

As previously noted above, though the foregoing detailed description describes certain aspects of one or more particular embodiments of the invention, alternatives could be adopted by one skilled in the art. For example, a capacitive sensor could differ in appearance and construction and various materials could be used in the fabrication of the corona poling apparatus and/or its components. As such, and again as was previously noted, it should be understood that the invention is not necessarily limited to any particular embodiment described herein or illustrated in the drawings.

The invention claimed is:

1. A capacitive sensor comprising:
   a 3D-printed dielectric layer having a first surface and a second surface oppositely disposed from the first surface, the dielectric layer being polarized;
   a first electrode on the first surface of the dielectric layer and deposited by direct ink writing; and
   a second electrode on the second surface of the dielectric layer and deposited by direct ink writing;
   wherein each of the first and second electrodes comprises a conductive ink that has been dried, the conductive ink comprising a silver paint and a silver paint dilutant.

2. The capacitive sensor of claim 1, wherein the capacitive sensor is a flexible poly (vinylidene fluoride) (PVdF) capacitive temperature sensor.

3. The capacitive sensor of claim 1, wherein the dielectric layer comprises a poly(vinylidene fluoride) PVdF film comprising a plurality of roads of extruded material, adjacent roads of the plurality of roads being bonded with each other along adjacent surfaces thereof.

4. The capacitive sensor of claim 1, wherein the dielectric layer has a thickness of 180 to 280 micrometers; and the dielectric layer, first electrode, and second electrode have a combined thickness of 200 micrometers to 380 micrometers.

* * * * *